United States Patent
Tanahashi et al.

(10) Patent No.: US 8,223,419 B2
(45) Date of Patent: Jul. 17, 2012

(54) SCANNING OPTICAL SYSTEM, OPTICAL SCANNING DEVICE, AND IMAGE FORMING DEVICE

(75) Inventors: Daisuke Tanahashi, Hachioji (JP); Yayoi Eguro, Hachioji (JP)

(73) Assignee: Konica Minolta Opto Inc., Tokyo (JP)

(*) Notice: Subject to any disclaimer, the term of this patent is extended or adjusted under 35 U.S.C. 154(b) by 171 days.

(21) Appl. No.: 12/864,858

(22) PCT Filed: Jan. 21, 2009

(86) PCT No.: PCT/JP2009/050825
§ 371 (c)(1),
(2), (4) Date: Jul. 27, 2010

(87) PCT Pub. No.: WO2009/096278
PCT Pub. Date: Aug. 6, 2009

(65) Prior Publication Data
US 2010/0309537 A1    Dec. 9, 2010

(30) Foreign Application Priority Data

Jan. 31, 2008   (JP) ................................. 2008-021313

(51) Int. Cl.
*G02B 26/08* (2006.01)

(52) U.S. Cl. ................................................ 359/205.1
(58) Field of Classification Search ..... 359/205.1–208.2
See application file for complete search history.

(56) References Cited

U.S. PATENT DOCUMENTS 7,977,440 B2 *  7/2011  Eguro .......................... 526/281

FOREIGN PATENT DOCUMENTS

| JP | 2001-249293 | 9/2001 |
|---|---|---|
| JP | 2002-365575 | 12/2002 |
| JP | 2005-218649 | 8/2005 |
| JP | 2006-70068 | 3/2006 |
| JP | 2006-70069 | 3/2006 |
| JP | 2006-171419 | 6/2006 |
| JP | 2006-313268 | 11/2006 |

* cited by examiner

*Primary Examiner* — Euncha Cherry
(74) *Attorney, Agent, or Firm* — Cozen O'Connor

(57) ABSTRACT

A scanning optical system is provided with a light source device (1), a deflection optical system (5) that deflects the light flux from the light source device (1) to carry our a scan in a main-scanning direction (y), and a scanning and image-forming optical system (8) that forms the light flux deflected by the deflection optical system (5) into an image on a scanning surface (H). The scanning and image-forming optical system (8) includes at least a first lens (6). The scanning optical system satisfies a predetermined condition relating to a numerical aperture of a light flux entering the deflection optical system (8) in a sub-scanning direction (z), and a distance between the deflection optical system (5) and the first lens (6). The first lens (6) is a plastic lens made of a predetermined resin as a base material.

13 Claims, 6 Drawing Sheets

SCANNING OPTICAL SYSTEM, OPTICAL SCANNING DEVICE, AND IMAGE FORMING DEVICE

RELATED APPLICATIONS

This is a U.S. National Phase Application under 35 U.S.C. 371 of International Application PCT/JP2009/050825, filed on Jan. 21, 2009.

This application claims the priority of Japanese Application No. 2008-021313 filed on Jan. 31, 2008, the entire content of which is hereby incorporated by reference.

TECHNICAL FIELD

The present invention relates to a scanning optical system, an optical scanning device, and an image-forming device such as a laser printer, a digital copier, and a multi-functional printer, all of which exhibit high resolution and use a light flux with a wavelength of 500 nm or less. In particular, the present invention relates to a scanning optical system, an optical scanning device, and an image-forming device, all of which exhibit an excellent durability while employing a plastic lens which can be manufactured inexpensively.

BACKGROUND ART

In general, an optical scanning device used for an image-forming device such as a laser printer, a digital copier, and a multi-functional printer is designed so that a light flux from a laser light source is deflected by a deflection optical system such as a polygon mirror, and is formed into an image as a light spot on a scanning surface by a scanning and image-forming optical system.

As the laser light source, a semiconductor laser and the like is commonly used. A divergent light emitted from the laser light source is converted into an almost parallel beam by a collimator lens, and the beam is subjected to a restriction of the shape by an aperture. The beam in which the shape was restricted is deflected by the deflection optical system such as a polygon mirror rotating at a fixed angular speed to enter the scanning and image-forming optical system. The scanning and image-forming optical system has a fθ characteristic, which scans a scanning surfaces arranged at predetermined spaces at a equidistant speed with a beam deflected at a fixed angular speed, and is required that curvature of field is successfully corrected to form a minute light spot over the whole scanning area.

In case where the polygon mirror is used in the deflection optical system, since the polygon mirror has an error in a mirror surface processing and a vibration of rotation axis, most of image-forming lens systems are provided with a face-tangle-error correction function to correct a shift in the scanning location in a sub-scanning direction (being a perpendicular direction to a main-scanning direction). Therefore, the image-forming lens system is designed to be an anamorphic lens system having different image forming characteristics between a main-scanning direction and a sub-scanning direction.

Heretofore, the above scanning and image-forming optical system has been manufactured out of glass materials. However, since a glass lens processing is difficult resulting in a high cost, it has been desired in recent years to manufacture the above scanning and image-forming optical system out of plastic materials in which the cost is low and an aberration can be compensated with a free form.

Further, heretofore, there has been provided an infrared laser (with the wavelength of about 780 nm), or a red laser (with the wavelength of about 650 nm), as a semiconductor laser used for a light source has, in general. In recent years, due to demand for higher resolution, a light scanning device has been developing using a light source of a short wavelength of 500 nm or less by which a minute spot shape can be obtained. Further, in recent years, due to demand for making the device smaller, it has also been desired to make the polygon mirror or the plastic lens smaller by making a beam size of a light source smaller by increasing the F number of the scanning and image-forming optical system using a light source with a short wavelength.

Most of the optical materials used for a plastic lens tend to decrease the transmittance due to internal absorption of the materials as the wavelength becomes shorter. In particular, when a light source with a short wavelength of 500 nm or less is used, the decrease in transmittance due to internal absorption becomes larger. Further, it was found that there is a problem that the transmittance further decreases due to cloudiness of the plastic lens when short-wavelength light is irradiated to the plastic lens for a long time.

To cope with the above problem, as a light scanning device using a light source of 500 nm or less, there has been proposed a light scanning device in which at least one lens in the scanning and image-forming optical system is a plastic lens (refer to Patent Literature 1).

In addition, there has been proposed a light scanning device in which, using a light source of 450 nm or less, an optical system between a light source and a deflection optical system is an optical element made of glass, and an scanning and image-forming optical system is an optical system made of plastic (refer to Patent Literature 2). This light scanning device is also trying to lower the cost in such a way that the optical element, in which a light flux continually transmits, is made of a glass optical element, and, on the other hand, the optical element of the scanning and image-forming optical system, in which a light flux does not always passes through, is made of a plastic optical element.

Patent Literature 1: Japanese Patent Document No. 3478819
Patent Literature 2: Japanese Patent Application Publication No. 2006-313268

DISCLOSURE OF THE INVENTION

Problems to be Solved by the Invention

However, though the above Patent Document 1 describes a restriction: on the difference in thickness of a plastic lens to reduce unevenness of distribution of an amount of light caused by internal absorption of the plastic lens, nothing is addressed about the decrease in the transmittance due to cloudiness of the plastic lens caused by short-wavelength light, and it tended to be a problem.

In the light scanning device described in the above Patent Document 2, when beam intensity is increased due to the scanning optical system being smaller, cloudiness is noticeable even in the optical element of the scanning and image-forming optical system, thereby the above light scanning device is insufficient to prevent the cloudiness. In addition, even in, for example, a high speed scanning by a multi-beam, it was insufficient to prevent the cloudiness since strong light is irradiated to the lens.

Therefore, it is an object of the present invention to provide a scanning optical system, an optical scanning device, and an image-forming device, which can suppress the reduction in the transmittance due to cloudiness, as well as making the device smaller.

Means to Solve the Problems

The above object of the present invention can be solved by the following structures.

As for a description about a scanning optical system described in item 1, a scanning optical system comprises:

a light source for emitting a light flux with a wavelength of 500 nm or less, a deflecting optical system for deflecting the light flux emitted from the light source to carry out a scan in a main-scanning direction; and a scanning and image-forming optical system for forming a light flux deflected by the deflecting optical system into an image on a scanning surface, wherein the scanning and image-forming optical system comprises a first plastic lens arranged to be adjacent to the deflection optical system, the scanning optical system satisfies $0.05 \leq NA1 \cdot t1 \leq 1.5$, where NA1 is a numerical aperture in a sub-scanning direction for a light flux entering the deflection optical system, and t1 [mm] is a distance between the deflecting optical system and the first plastic lens, and wherein the first plastic lens is a plastic lens comprising a resin comprising a copolymer of α-olefin and cyclic olefin, as a base material, and the cyclic olefin is represented by the following general formula (I) or (II).

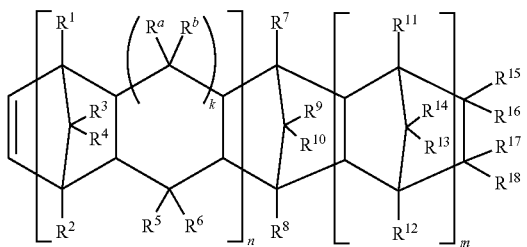

(I)

In the formula (I), n is 0 or 1, m is 0 or a positive integer, k is 0 or 1, and each of $R^1$ to $R^{18}$, $R^a$, and $R^b$ independently represents hydrogen atom, halogen atom, or hydrocarbon group.)

[Chem. 2]

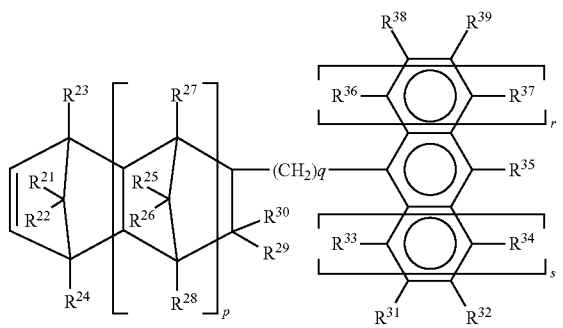

(II)

In the formula (II), each of p and q is 0 or a positive integer independently, each of r and s is one of 0, 1, and 2 independently, each of $R^{21}$ to $R^{39}$ represents independently hydrogen atom, halogen atom, hydrocarbon group, or alkoxy group.

As for a description of item 2, according to the scanning optical system of item 1, the scanning and image-forming optical system further comprises a second plastic lens arranged at a scanning-plane side of the first plastic lens, the second plastic lens is a plastic lens including the resin as a base material, and the scanning optical system satisfies $0.05 \leq t2/f1 \leq 0.4$ and $f1 \geq 0$, where f1 [mm] is a focal length of the first plastic lens in the main-scanning direction, and t2 is a distance between the first plastic lens and the second plastic lens.

As for a description of item 3, according to the scanning optical system of item 2, at least one of the first plastic lens and the second plastic lens has a cross section being in asymmetry, where the cross section is parallel to the main-scanning direction.

As for a description of item 4, according to the scanning optical system of any one of items 1 to 3, the resin comprises light stabilizer.

As for a description of item 5, according to the scanning optical system of any one of items 1 to 4, the scanning optical system satisfies $0.1 \leq NA1 \cdot t1 \leq 1$.

As for a description of item 6, according to the scanning optical system of item 2, the scanning optical system satisfies $0.1 \leq t2/f1 \leq 0.25$.

As for a description of item 7, according to the scanning optical system of any one of items 1 to 6, the scanning optical system satisfies $0.25 \leq \Sigma d/f \leq 0.5$, where f [mm] is a focal length of a total system of the scanning and image-forming optical system in the main-scanning direction, and $\Sigma d$ [mm] is a distance from the deflecting optical system to an optical surface arranged at a closest position to the scanning surface in the scanning and image-forming optical system.

As for a description of item 8, in the scanning optical system of any one of items 1 to 7, the light source emits two or more light fluxes.

As for a description of item 9, according to the scanning optical system of any one of items 1 to 8, the first plastic lens has a cross section being in asymmetric, where the cross section is parallel to the main-scanning direction.

As for a description of item 10, the scanning optical system of any one of items 1 to 9, further comprises an optical element comprising at least one optical surface on which a diffractive structure is formed.

As for a description of item 11, according to the scanning optical system of any one of items 1 to 10, the deflecting optical system comprises a resonance mirror for deflecting the light flux emitted from the light source by sinusoidal oscillation of a reflection surface of the resonance mirror.

As for a description of item 12, an optical scanning apparatus comprises the scanning optical system of any one of items 1 to 11.

As for a description of item 13, an image-forming apparatus comprises the optical scanning apparatus of item 12.

As a result of the study of the present inventors, the following matter has been found under a condition that a scanning and image-forming optical system including a plastic lens has been employed. Assuming that a first lens is a lens arranged at the closest potion to the deflecting optical system in the scanning and image-forming optical system, a beam which is once converged in the sub-scanning direction by the deflecting optical system for correcting face tangle error, has a extremely great power per unit area. Therefore, emitting the beam to the first lens tends to cause cloudiness. As a result of the further study of the present inventors, the following matter has been found. When the first plastic lens is formed out of the above resin as a basic material, and the optical system satisfies $0.05 \leq NA1 \cdot t1 \leq 1.5$, where NA1 is a numerical aperture in the sub-scanning direction for a light flux entering the deflection optical system, and t1 is a distance between the deflecting optical system and the first plastic lens, there can be provided an optical system which does not cause a reduction of transmittance due to cloudiness and exhibits an excellent durability. In the expression, the distance t1 between the deflecting optical system and the first plastic lens means a distance of a principal ray perpendicularly hitting a scanning surface among beams reflected by the deflecting optical system, namely, a minimum distance along the optical axis between the deflecting optical system and an optical surface facing the deflecting optical system in the first plastic lens.

When the scanning and image-forming optical system is a two-element structure further including the second lens arranged at the scanning side of the first lens, the second lens is preferably prepared as a plastic lens formed of the resin as a basic material. Further, when a space between the first lens and the second lens is excessively large, converging light with the first leis results in light with great intensity per unite area which is emitted to the second lens, because the first lens has a power in the main-scanning direction. Therefore, in order to reduce the cloudiness in the second lens effectively, a structure satisfying $0.05 \leq t2/f1 \leq 0.4$, and $f1 \geq 0$ is further preferable. In the expression, the distance t2 between the first plastic lens and the second plastic lens means a maximum distance along the optical axis between the optical surface facing the scanning surface in the first plastic lens and the optical surface facing the deflecting optical system in the second plastic lens.

Effects of the Invention

According to the present invention, a size of apparatuses can be reduced and a reduction of the transmittance caused by cloudiness can be controlled.

Figure 4A:
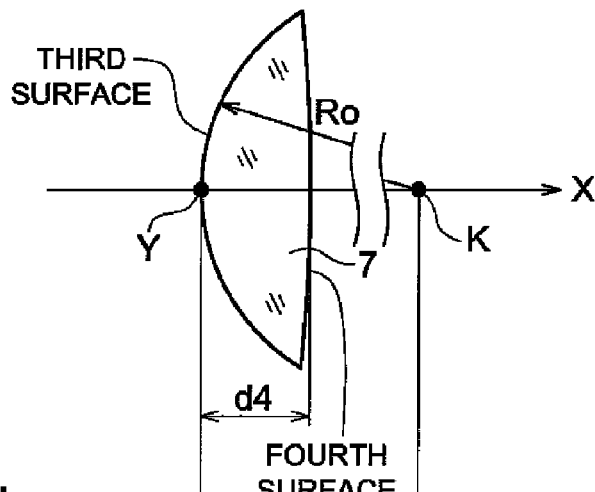
Figure 4B:
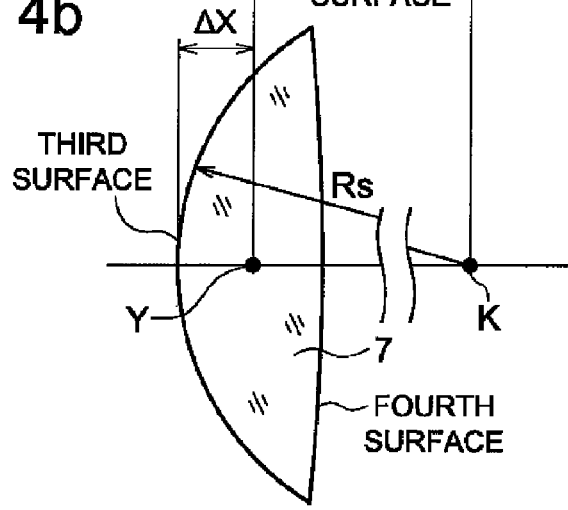

Each of FIGS. 4a and 4b is a schematic view showing a shape of a cross section perpendicular to the Y axis of the second lens.

Figure 5:
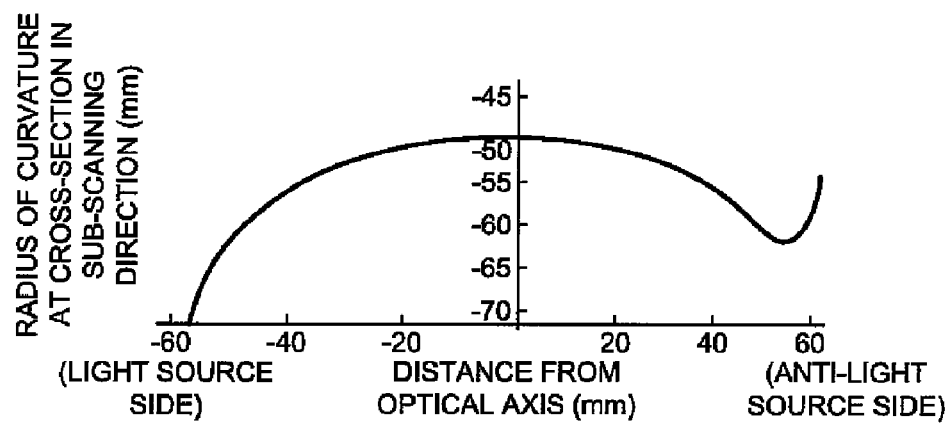

FIG. 5 is a figure showing a relationship between the curvature radius at a cross section perpendicular to the sub-scanning direction of the second lens, and the distance from the optical axis.

Figure 6:
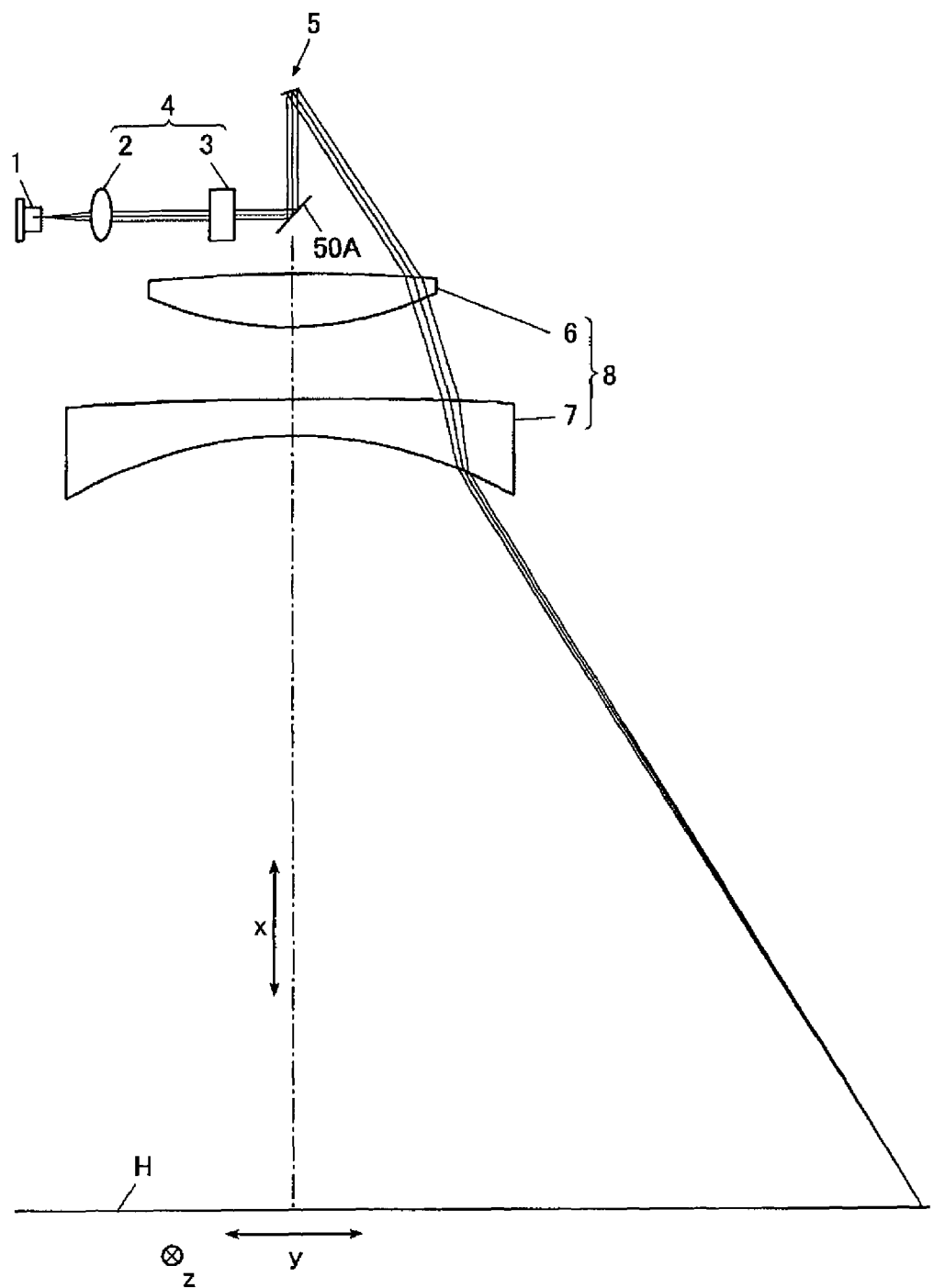

FIG. 6 is a schematic configuration diagram of the scanning optical system in Example 4.

Figure 7:
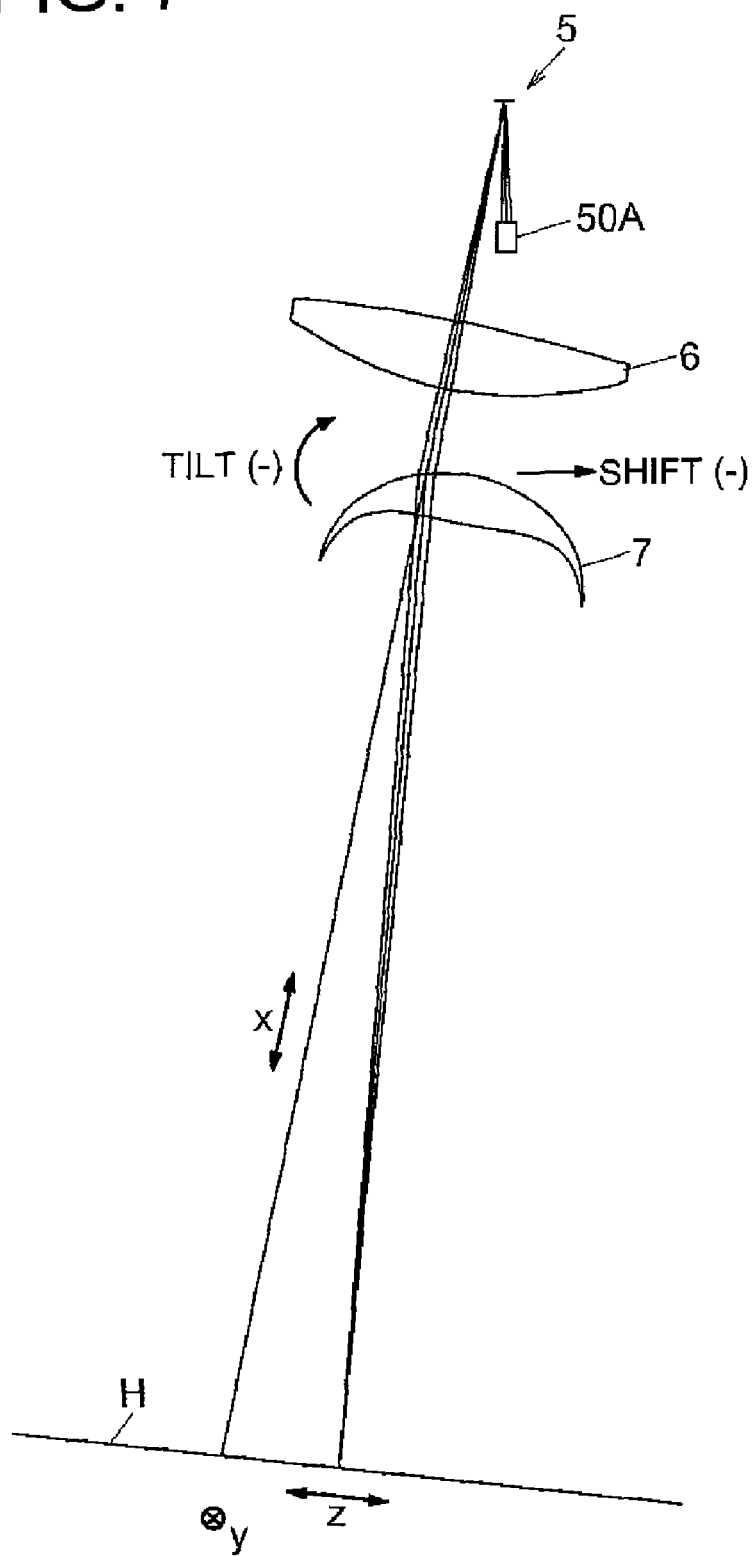

FIG. 7 is a schematic configuration diagram of the scanning optical system in Example 4.

REFERENCE SIGNS LIST

1: Light source device (light source)
5: Deflecting optical system
6: First lens (first plastic lens)
7: Second lens (second plastic lens)
8: Scanning and image-forming optical system
50: Polygon mirror
50A: Resonance mirror
100: Optical scanning device
101: Scanning optical system (optical scanning device)
200: Laser printer (image-forming device)
H: Scanning surface

BEST MODE FOR CARRYING OUT THE INVENTION

Preferred embodiments of the present invention will be described below with reference to the figures. In the present embodiments, as the image-forming device relating to the present invention, a laser printer will be described as an example.

Figure 1:
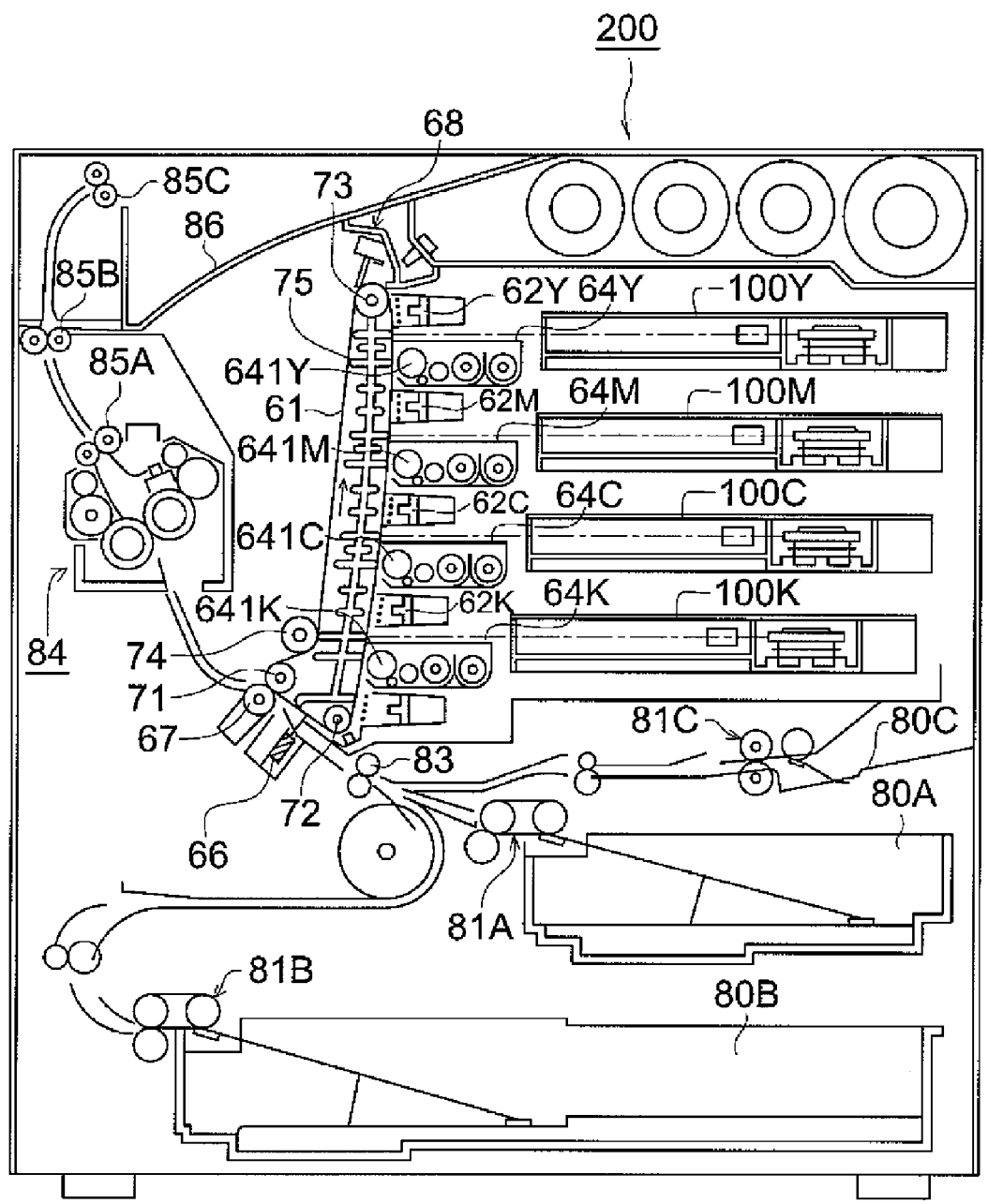
FIG. 1 is a schematic configuration diagram of a laser printer, which is an example of an image-forming device including an optical scanning device provided with a scanning optical system relating to the present embodiment.

FIG. 1 is a schematic configuration diagram of laser printer 200, which is an example of an image-forming device having an optical scanning device provided with a scanning optical system relating to the present embodiment.

Laser printer 200 shown in FIG. 1 is capable of forming a color image, and is a system in which sections such as a writing section, and a developing section are separately arranged for each of blue, green, red, and black, and each of four optical scanning devices in the writing section is provided with the scanning optical system relating to the present embodiment.

Laser printer 200 of the present example forms a color image by superimposing toner images in each of colors which are successively formed on an image bearing body, after which the superimposed toner images are transferred at a time onto a recording paper at a transfer section.

Around a flexible endless belt shaped photoreceptor 61 being an image bearing body, (hereinafter referred to as a belt photoreceptor), there are arranged plural image-forming units (four units illustrated in the figure) in single file. The plural image-forming units comprises scorotron chargers 62Y, 62M, 62C, and 62K (hereinafter referred to as a charger), optical scanning devices 100Y, 100M, 100C, and 100K, and developing devices MY, 64M, 64C, and 64K. Interior of each of the optical scanning devices 100Y, 100M, 100C, and 100K, the scanning optical system is arranged.

Belt photoreceptor 61 is stretched and supported by driving roller 71 and rotatable rollers 72 and 73, and is kept in a tension state by an effect of tension roller 74. The belt photoreceptor 61 rotates in the clockwise direction in the figure while partially making a close contact with backup member 75 provided on the inner periphery surface. The backup member 75 is made close contact with the back of the belt photoreceptor 61 to regulate a developing area of a developer bearing body 641 (hereinafter referred to as a developing sleeve) and image forming locations of the light scanning devices 100 (Y, M, C, and K).

When image formation starts, a driving motor rotates to rotate, through the driving roller 71, the belt photoreceptor 61 in the clockwise direction of the figure, and there begins application of electric potential to the belt photoreceptor 61 by a charging effect of the charger 62Y. After the application of electric potential to the belt photoreceptor 61, there begins, at the optical scanning device 100Y, an exposure by an electric signal corresponding to the first color signal, that is, a yellow (Y) image signal. Thereby, by rotation (a sub-scanning) of the belt photoreceptor 61, an electrostatic latent image corresponding to the yellow (Y) image of the developed image is formed on a photosensitive layer of the surface of the belt photoreceptor 61. The above latent image is subjected to a reverse development with developers being in a non-contact state, which developers were transferred and attached by the developing device 64Y on the development sleeve 641Y, being a developer bearing body, whereby a yellow (Y) toner image is formed corresponding to the rotation of the belt photoreceptor 61.

Subsequently, electric potential is further applied to the belt photoreceptor 61, on which the yellow (Y) toner image is formed, by a charging effect of the charger 62M, and then, an exposure by an electric signal corresponding to the second color signal of the optical scanning device 100M, that is, a magenta (M) image signal, is carried out, whereby, via a non-contact reverse development by the developing device 64M, a magenta (M) toner image is superimposed on the above-mentioned yellow (Y) image.

In a similar process to the above, by the charger 62C, the optical scanning device 100C and developing device 64C, a cyan (C) toner image corresponding to the third color signal is further formed. Furthermore, by the charger 62K, the optical scanning device 100K and developing device 64K, a black (K) toner image corresponding to the fourth color signal is successively superimposed, resulting in a formation of a color toner image on the peripheral surface of the belt photoreceptor 61 within one rotation thereof.

In the developing effects by the developing devices 64Y, 64M, 64C, and 64K, direct current bias having the same polarity as the belt photoreceptor 61, or development bias in which alternate current is added to the direct current is applied to each of the development sleeves 641Y, 641M, 641C and 641K to carry out the non-contact reverse development by a two-component developer attached to the development sleeves 641 (Y, M, C and K), whereby toner is attached on the exposed portion on the belt photoreceptor 61, in which an electrically conductive layer is grounded.

In this way, the color toner image formed on the periphery surface of the belt photoreceptor 61 is subjected to an electric discharge by a pre-transfer exposure after making electric potential of attached toner uniform by a charger, is transferred onto a transfer sheet of paper in the transfer section by a transfer device (a transfer roller) 67 which is arranged facing the lower portion of the driving roller 71 which is used for driving the belt photoreceptor 61. The above transfer sheet of paper is sent out from a sheet feeding cassettes 80A and 80B, being a sheet feeding device, or from a manual sheet feeding section 80C by sheet feeding means 81A, 81B, and 81C, respectively, transferred to a pair of registration rollers 83, and fed in synchronization with a toner region on the belt photoreceptor 61 by driving the pair of registration rollers 83.

Photosensor 66 is arranged at a prescribed position between the registration roller 83 and the transfer roller 67, and the position is facing the belt photoreceptor 61, which is stretched and arranged between the driving roller 71 and the rotating roller 72. The photosensor 66 is a sensor detecting a joint of the belt photoreceptor 61 and a registration mark formed on the belt photoreceptor 61, and is composed of a pair of light emitting unit and light receiving unit.

The transferred material (a transfer sheet), which received a transfer of a toner image, is separated from a peripheral surface of the belt photoreceptor 61, which is along the curvature of the driving roller 71, and then conveyed to a fixing device 84. The toner is deposited and fixed on the transfer sheet by being heated and pressed at the fixing device 84, and then discharged from the fixing device 84. The discharged sheet of paper is conveyed by sheet discharge roller pairs 85A, 85B, and 85C, and then discharged, with the toner image surface on the transfer sheet being down-faced, on a sheet discharge tray 86 arranged at the top of the apparatus.

In the laser printer 200 shown in FIG. 1, the image bearing body is composed of a piece of the belt photoreceptor 61, but it may be composed of four photoreceptor drums corresponding to each of colors.

Figure 2:
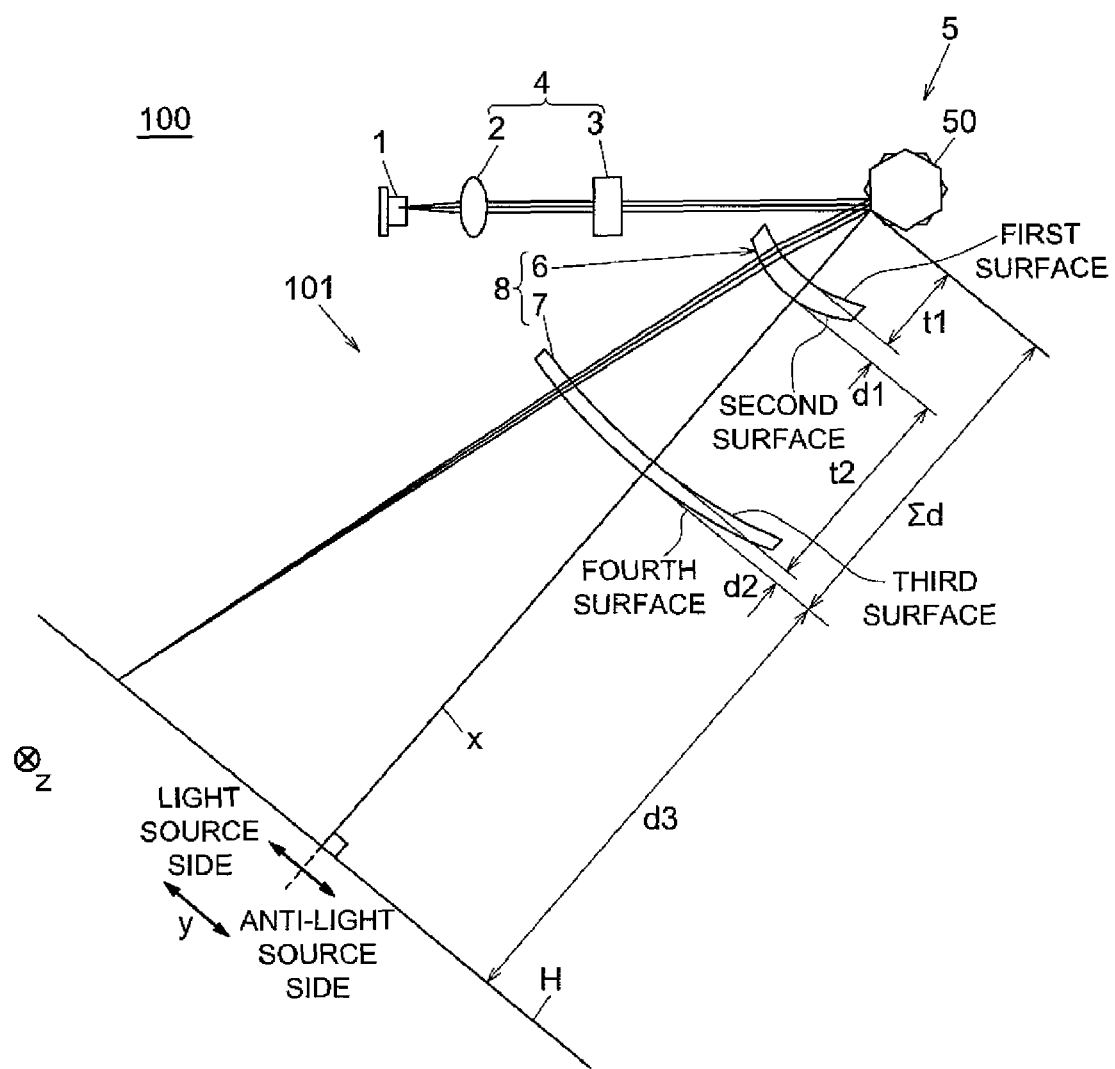
FIG. 2 shows an example of a scanning optical system arranged in an optical scanning device.

FIG. 2 shows an example of the scanning optical system 101 arranged in the optical scanning device 100.

As shown in FIG. 2, optical scanning device 100 is provided with scanning optical system 101 which carries out a scan with a laser light in the main-scanning direction y, and the scanning optical system 101 comprises light source device 1, line-image-forming optical system 4, deflection optical system 5, and scanning and image-forming optical system 8.

Among them, light source device 1 emits a light flux having a wavelength of 500 nm or less. The line-image-forming optical system 4 is composed of collimator lens 2 and cylindrical lens 3, and is designed so as to form the light flux from the light source device 1 into a line image elongated in a direction corresponding to main-scanning direction y1 on the deflection optical system 5. The term "a direction corresponding to main-scanning direction y1" is a direction corresponding to the main-scanning direction y, and, in the present embodiment, is a direction perpendicular to both the optical axis direction x of the light source device 1 and the sub-scanning direction z (being a rotating-axis direction of the polygon minor).

Deflection optical system 5 has a polygon mirror 50 which deflects a light flux from the light source device 1.

The above polygon mirror 50 has a reflection surface for deflection in the vicinity of the image forming position of the line image formed by the line-image-forming optical system 4, and is arranged so as to reflect the light flux from the line-image-forming optical system 4 and deflect it at a constant angular velocity by rotating the aforesaid reflection surface around the rotation axis as the rotating center, where the rotation axis is parallel to the sub-scanning direction z, to carry out a scan in the main-scanning direction. In the plane perpendicular to the main-scanning direction y, the reflection surface of the polygon mirror 50 is in a geometric-optically conjugated relation with the scanning surface H.

The scanning and image-forming optical system 8 forms a light spot on the aforesaid scanning surface H by converging the deflected light by the polygon mirror 50 toward the scanning surface H, and is subjected to an aberration correction so as to carry out a scan with the deflected light flux at a constant velocity on the scanning surface H. The above scanning and image-forming optical system 8 comprises first lens 6 and second lens 7 in the order from the polygon mirror 50 side.

The first lens 6 is arranged adjacent to the polygon mirror 50, and is a positive meniscus lens with the concave surface facing the aforesaid polygon mirror 50. The first lens 6 may have a shape exhibiting different power as being away from the optical axis in the main-scanning direction y, for example, a shape of ring-zones.

The second lens 7 has at least one anamorphic surface.

Figure 3A:
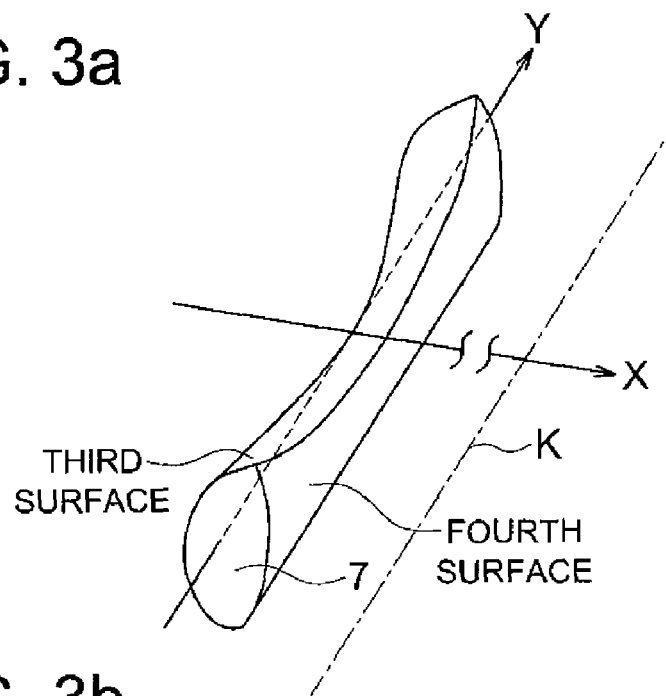
FIG. 3a, and FIG. 3b show an oblique perspective view of the second lens, and a cross-sectional view in the X-Y plane of the second lens, respectively.
Figure 3B:
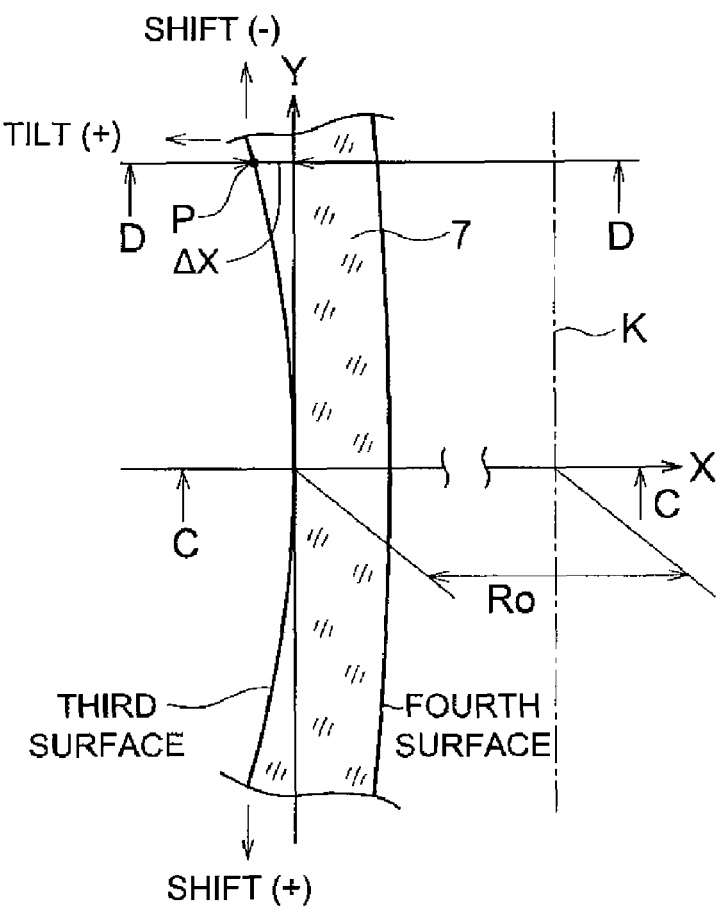

FIGS. 3a and 3b are illustrations in case where the optical surface of the second lens 7 facing the light source side, that is, the third surface in the scanning and image-forming optical system 8 (refer to FIG. 2), is formed into an anamorphic surface.

As shown in FIGS. 3a and 3b, assuming that "reference axis X" is a principal ray hitting scanning surface H among reflection beams from polygon mirror 50, in other words, the optical axis of the scanning and image-forming optical system 8, "Y axis" is an axis which passes through an intersection between the reference axis X and the anamorphic surface, and is perpendicular to the reference axis X and parallel to the main-scanning direction y, and "Z axis" is an axis perpendicular to both the reference axis X and the Y axis, the anamorphic surface of the second lens 7 is a surface made by a rotation around an axis K which is located the curvature radius away from a cross-sectional surface along the sub-scanning direction z on the above reference axis X.

In more detail, as shown in FIG. 2b, in this anamorphic surface, a shift length ΔX between an off-axis point P and the Y axis is represented by the expression (i) below.

$$\Delta X = \frac{Y^2/R}{1+\sqrt{1-(K+1)Y^2/R^2}} + \sum_{j=1}^{n} A_j Y^{\alpha j} \quad (i)$$

In the expression, R is a curvature radius, K is a conic constant, Aj is an aspheric surface coefficient, αj is an order of the aspheric surface.

Each of FIGS. 4a and 4b is a schematic view showing a shape of a cross section perpendicular to the Y axis, being the sub-scanning direction, of the second lens 7. FIG. 4a shows a cross-section cut at C-C line (on the X axis) shown in FIG. 3b, and FIG. 4b shows a cross-section cut at D-D line shown in FIG. 3b.

$$R_s = R_o - \Delta X \quad (ii)$$

In the expression, $R_{oi}$ is a curvature radius in a Z-X plane containing the reference axis X, and a curvature radius $R_s$ in the Z-X plane varies as being away from the aforesaid reference axis X.

The above-described anamorphic surface is a circular arc or a non-circular arc in the ZX plane. By making the above curve a proper shape, an image plane in the sub-scanning direction z can be successfully corrected at the central part, at intermediate parts, and over to the periphery of the picture plane, thereby there can be obtained nearly a uniform beam diameter in the sub-scanning direction z on the image plane.

In a lens having such an anamorphic surface, as shown in FIG. 3b, an optical surface may be shifted and/or tilted with respect to the reference axis X. The shape of the anamorphic surface is not limited to the above expression (i), but may be other surfaces (for example a free-form surface), in which a curvature radius in the sub-scanning direction z varies independently to that in the main-scanning direction y as being away from the reference axis X. Further, it may be designed so that the first lens 6 includes the anamorphic surface.

At least one of the above first lens 6 and second lens 7 may have, within a cross section parallel to the main-scanning direction y, an optical surface in bilateral asymmetry between the light source device 1 side and the opposite side (refer to FIG. 2) with reference to the center line. In this case, even in a case that a reflection surface shifts due to a rotation of the polygon mirror, a curvature of field (in particular, a curvature of field in the sub-scanning direction z) caused by a shift of the aforesaid reflection surface can be restricted to become asymmetric with respect to the z axis.

The first lens 6 and the second lens 7 may have a diffraction structure on at least one of their optical surfaces. A lens made of resin has a large variation in a refractive index due to changes of environmental temperature or a wavelength of the light source compared to a glass lens, thereby a position of an image plane or magnification varies due to a variation in a refractive index, resulting in image deterioration. In particular, at wavelength of light source of 500 nm or less, the variation in a refractive index of lens due to wavelength changes is large compared to that of infrared or red wavelength, therefore the effect can not be ignored. Regarding this point, if the first lens 6 and the second lens 7 have a diffraction structure on at least one of their optical surfaces, even if the first lens 6 and the second lens 7 are made of resin, out of focus at an image plane position caused by variation in a refractive index due to temperature change can be reduced.

The scanning optical system 101 described above satisfies $0.05 \leq NA1 \cdot t1 \leq 1.5$, and more preferably satisfies $0.1 \leq NA1 \cdot t1 \leq 1$, where NA1 is a numerical aperture (NA) in the sub-scanning direction z of a light flux entering the polygon mirror 50, and t1 [mm] is the distance from the polygon mirror 50 to the first lens 6.

Like the light scanning device 100 of the present embodiment, in a device in which scanning is carried out by the deflected optical system 5 such as the polygon mirror 50, a long and narrow light flux, which was narrowed down in the sub-scanning direction z by the line-image-forming optical system 4 for a face tangle error correction, is converged and enters the polygon mirror 50. Therefore, if the distance between the polygon mirror 50 and the first lens 6 is small, the light flux tight after a reflection at the polygon mirror 50 (being the light flux right after being converged in the sub-scanning direction z and having a strong power) enters the first lens 6, resulting in generation of cloudiness in the aforesaid first lens 6.

Regarding this point, since the scanning and image-forming optical system 8 satisfies, as described above, the following expression: $0.05 \leq NA1 \cdot t1 \leq 1.5$, and, in addition, a plastic material to be described later is used for the first lens 6, generation of cloudiness in the first lens 6 can be prevented.

If the expression: $NA1 \cdot t1 < 0.05$ holds, light with a high intensity per unit area passes through the first lens 6, as a result that the distance between the polygon mirror 50 and the scanning and image-forming optical system 8 becomes small, thereby, the cloudiness is likely to occur in the aforesaid first lens 6. On the other hand, the expression: $1.5 < NA1 \cdot t1$ holds, the whole of the optical scanning device (the light scanning optical system) 101 becomes large, though the cloudiness is hard to occur in the first lens 6 and the like.

Further, the scanning and image-forming optical system 8 preferably satisfies the expressions: $0.05 \leq t2/f1 \leq 0.4$, and, $f1 \geq 0$, and more preferably satisfies the expression: $0.1 \leq t2/f1 \leq 0.25$, where f1 [mm] is a focal length in the main-scanning direction of the first lens 6, and t2 [mm] is a distance between the first lens 6 and the second lens 7.

Like the scanning optical system 101 in the present embodiment, in a device employing two-lens structure for the scanning and image-forming optical system 8, the first lens 6 placed at the polygon mirror 50 side mainly has the power (refractive power) in the main-scanning direction y, and the light flux narrowed down by the first lens 6 enters the second lens 7 placed at the image side. Therefore, if the beam intensity (the amount of light per unit area) is large, a long period irradiation generates cloudiness in the aforesaid first lens 7. Regarding this point, since the scanning and image-forming optical system 8, as described above, satisfies the expressions: $0.05 \leq t2/f1 \leq 0.4$, and $f1 \geq 0$, the generation of cloudiness of the second lens 7 can be prevented.

If the expression: $0.4 \leq t2/f1$ holds, a distance between the first lens 6 and the second lens 7 becomes large, and as a result, the light narrowed down by the first lens 6 to have a large beam intensity per unit area is transmitted through the second lens 7, thereby cloudiness is likely to be generated. On the other hand, if the expression: $t2/f1 < 0.05$ holds, it becomes difficult to exhibit basic optical properties such as compatibility between a uniform scanning characteristic and an excellent curvature of field characteristic, and, at the same time, a total system of the image-forming optical system becomes large.

The scanning and image-forming optical system 8 satisfies the expression: $0.25 \leq \Sigma d/f \leq 0.5$, where f [mm] is a focal length in the main-scanning direction of the total system of the aforesaid scanning and image-forming optical system 8, and $\Sigma d$ [mm] is a distance from the polygon mirror 50 to an optical surface at the closest position to the scanning surface H in the aforesaid scanning and image-forming optical system 8 (an optical surface at the scanning surface H side in the second lens 7 in the present embodiment) is designated as $\Sigma d$ [mm]. With this configuration, the whole scanning and image-forming optical system 8 can be made smaller, and at the same time, the production cost can be reduced. Further, since a ratio of uneven thickness between the central part and the peripheral part of the first lens 6 and the second lens 7 can be reduced, unlike in the case of a large ratio of uneven thickness, it is possible to prevent a lack of image uniformity caused by a difference in light amount at each image forming position.

If the expression: $0.5 < \Sigma d/f$ holds, the lens unit of the whole scanning and image-forming optical system 8 increases in size. In addition to that, the ratio of uneven thickness of the first lens 6 and the second lens 7 increases in size, leading to a different lens passing distance between light passing through the central part of a lens and light passing through the periphery of a lens, resulting in a lack of uniformity of amount of light reaching the scanning surface H. In particular, in case where a wavelength of blue light is used as a light flux, and lenses made of resin are used as the first lens 6 and the second lens 7, such a problem becomes pronounced due to a high internal absorptance of a lens. Further, if the expression: $\Sigma d/f < 0.25$ holds, it becomes difficult to exhibit basic optical properties such as compatibility between a uniform scanning characteristic and an excellent curvature of field characteristic.

Next, materials of the first lens 6 and the second lens 7 will be described.

A material for a base material of at least the first lens 6 of the first lens 6 and the second lens 7 is a plastic material, and preferably a material for a base material of the second lens 7 is also a plastic material.

As the plastic material of these first lens 6 and the second lens 7, preferably used is a resin composite exhibiting an excellent light resistance to a blue-violet laser having a short wavelength and a thermal resistance. As a matrix resin of such a resin composite, a copolymer resin comprising α-olefin and a cyclic olefin is preferably used.

The cyclic olefin in a copolymer constituting a resin composite preferably includes the cyclic olefins represented by the general formula (I) or (II) described below.

In the formula, n is 0 or 1, m is 0 or a positive integer, and k is 0 or 1. In case of k being 1, a ring represented by using k becomes a six-membered ring, and in case of k is 0, the ring becomes a five-membered ring.

Each of $R^1$ to $R^{18}$, $R^a$ and $R^b$ independently represents a hydrogen atom, a halogen atom, or a hydrocarbon group. The halogen atom represents a fluorine atom, a chlorine atom, a bromine atom, or an iodine atom.

The hydrocarbon group commonly includes an alkyl group having a carbon atom of 1 to 20, a halogenated alkyl group having a carbon atom of 1 to 20, a cycloalkyl group having a carbon atom of to 15, or an aromatic hydrocarbon group. More specifically, the alkyl group includes such as a methyl group, an ethyl group, a propyl group, an isopropyl group, an amyl group, a hexyl group, an octyl group, a decyl group, a dodecyl group, and an octadecyl group. These alkyl groups may be substituted with a halogen atom.

The cycloalkyl group includes a cyclohexyl group, and the aromatic hydrocarbon group includes a phenyl group, and a naphthyl group. In the above Formula (I), each pair of $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ may be joined (to cooperate with each other) to form a monocyclic or polycyclic group, and further, the single ring or the multi-ring thus formed may have a double bond. The single ring or the multi-ring formed here is specifically cited below.

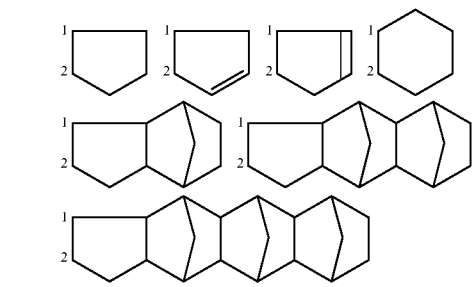

In the above examples, a carbon atom numbered by 1 or 2 represents a carbon atom, each of which has a $R^{15}(R^{16})$ or $R^{17}(R^{18})$ bonding respectively.

An alkylidene group may be formed with $R^{15}$ and $R^{16}$ or $R^{17}$ and $R^{18}$. Such an alkylidene group is generally an alkylidene group having a carbon atom of 2 to 20, and specific examples of such an alkylidene group include an ethylidene group, a propylidene group, and an isopropylidene group.

(I)

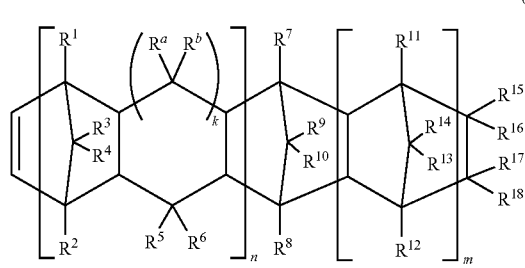

(II)

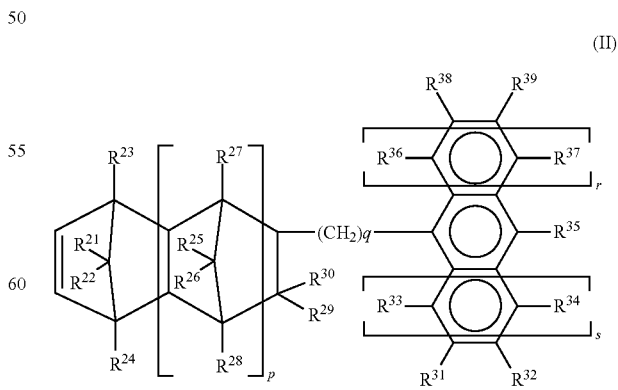

In the formula, each of p and q is independently 0 or a positive integer, and each of r and s is independently 0, 1, or 2. Each of $R^{21}$ to $R^{39}$ independently represents a hydrogen atom, a halogen atom, a hydrocarbon group, or an alkoxy group.

The halogen atom is the same as the halogen atom in the above Formula (I). The hydrocarbon group commonly includes an alkyl group having a carbon atom of 1 to 20, a halogenated alkyl group having a carbon atom of 1 to 20, a cycloalkyl group having a carbon atom of 3 to 15, or an aromatic hydrocarbon group. More specifically, the alkyl group includes such as a methyl group, an ethyl group, a propyl group, an isopropyl group, an amyl group, a hexyl group, an octyl group, a decyl group, a dodecyl group, and an octadecyl group. These alkyl groups may be substituted with a halogen atom.

The cycloalkyl group includes a cyclohexyl group, and the aromatic hydrocarbon group includes an aryl group, and an aralkyl group, and specifically includes a phenyl group, a tolyl group, a naphthyl group, a benzyl group, a phenylethyl group.

The alkoxy group includes a methoxy group, an ethoxy group, and a propoxy group. A carbon atom to which $R^{29}$ and $R^{30}$ are joined and a carbon atom to which $R^{33}$ is joined or a carbon atom to which $R^{31}$ is joined may be joined directly or through an alkylene group having a carbon atom of 1 to 3. Namely, in case where the above two carbon atoms are joined to each other through an alkylene group, $R^{29}$ and $R^{33}$, or $R^{30}$ and $R^{31}$ form, in cooperation with each other, any one of the alkylene group of a methylene group (—$CH_2$—), an ethylene group (—$CH_2CH_2$—), a propylene group (—$CH_2CHCH_3$—), or a trimethylene group (—$CH_2CH_2CH_2$—).

Further, when r=s=0, $R^{35}$ and $R^{32}$ or $R^{35}$ and $R^{39}$ may be joined with each other to form a monocyclic or polycyclic aromatic ring. Specifically, when r=s=0, the following aromatic rings formed by $R^{35}$ and $R^{32}$ are cited:

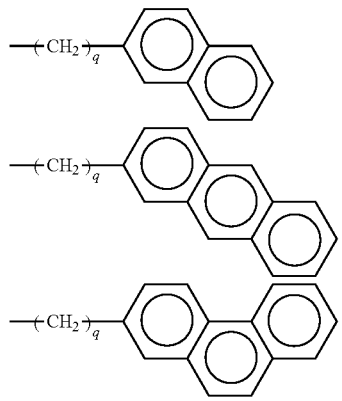

In the above, q is the same as q in Formula (II). The cyclic olefins represented by Formula (I) or (II) as described above specifically include bicyclo-2-heptene derivatives (bicyclohept-2-ene derivatives), tricyclo-3-decene derivatives, tricyclo-3-undecene derivatives, tetracyclo-3-dodecene derivatives, pentacyclo-4-pentadecene derivatives, pentacyclopentadecadiene derivatives, pentacyclo-3-pentadecene derivatives, pentacyclo-3-hexadecene derivatives, pentacyclo-4-hexadecene derivatives, hexacyclo-4-heptadecene derivatives, heptacyclo-5-eicocene derivatives, heptacyclo-4-eicocene derivatives, heptacyclo-5-heneicocene derivatives, octacyclo-5-docosene derivatives, nonacyclo-5-pentacosene derivatives, nonacyclo-6-hexacosene derivatives, cyclopentadiene-acenaphthylene adducts, 1,4-metano-1,4,4a,9a-tetrahydrofluorene derivatives, and 1,4-metano-1,4,4a,5,10,10a-hexahydroanthracene derivatives.

The α-olefin which forms a copolymer includes, for example, straight chain α-olefins such as ethylene, propylene, 1-butene, 1-pentene, 1-hexene, 1-octene, 1-decene, 1-dodecene, 1-tetradecene, 1-hexadecene, 1-octadecene and 1-eicocene; and branched chain α-olefins such as 4-methyl-1-pentene, 3-methyl-1-pentene, and 3-methyl-1-butene. The α-olefins having carbon atoms of 2 to 20 are preferable. Such the straight chain or branched chain olefins may be substituted with a substitution group, and may be used singly or in combinations of two or more.

The various substitution groups are cited, but are not particularly limited, and typical examples include each of groups of alkyl, aryl, anilino, acylamino, sulfonamide, alkylthio, arylthio, alkenyl, cycloalkyl, cycloalkenyl, alkynyl, heterocycle, alkoxy, aryloxy, heterocyclic oxy, siloxy, amino, alkylamino, imido, ureido, sulfamoylamino, alkoxycarbonylamino, aryloxycarbonylamino, alkoxycarbonyl, aryloxycarbonyl, heterocyclicthio, thioureido, hydroxyl and mercapto, as well as spiro compound residues, bridged hydrocarbon compound residues, each of groups of sulfonyl, sulfinyl, sulfonyloxy, sulfamoyl, phosphoryl, carbamoyl, acyl, acyloxy, oxycarbonyl, carboxyl, cyano, nitro, halogen substituted alkoxy, halogen substituted acyloxy, pyrrolyl, tetrazolyl, and a halogen atom.

The above-described alkyl group preferably has carbon atoms of 1 to 32, and may be straight chain or branched. As the aryl group, a phenyl group is preferred.

The acylamino group includes an alkylcarbonylamino group and an arylcarbonylamino group. The sulfonamide group includes an alkylsulfonylamino group, and an arylsulfonylamino group. The alkyl component and aryl component in the alkylthio group and the arylthio group include the above alkyl group and aryl group.

The alkenyl group preferably has carbon atoms of 2 to 23, and the cycloalkyl group preferably has carbon atoms of 3 to 12, and particularly preferably has carbon atoms of 5 to 7. The alkenyl group may be a straight or branched chain. The cycloalkenyl group preferably has carbon atoms of 3 to 12, and particularly preferably has carbon atoms of 5 to 7.

The ureido group includes an alkyl ureido group, and an aryl ureido group. The sulfamoylamino group includes an alkyl sulfamoyl amino group, and an aryl sulfamoyl amino group. Heterocyclic group preferably has 5 to 7 members, and specific examples include 2-furyl, 2-thienyl, 2-pyrimidinyl, and 2-benzothiazolyl. The saturated heterocyclic ring preferably has 5 to 7 members, and specific examples include tetrahydropyranyl, and tetrahydrothiopyranyl. The heterocyclic oxy group preferably has a heterocyclic ring having 5 to 7 members, and specific examples include 3,4,5,6-tetrahydropyranyl-2-oxy, and 1-phenyltetrazole-5-oxy. The heterocyclic thio group preferably has 5 to 7 members and examples include 2-pyridylthio, 2-benzothiazorylthio, and 2,9-diphenoxy-1,3,5-triazole-6-thio. The siloxy group includes trimethylsiloxy, triethylsiloxy, and dimethylbutylsiloxy. The imido group includes imide succinate, 3-heptadecyl imide succinate, phthalimide, and glutarimide. The spiro compound residue includes spiro[3.3]heptane-1-yl. The bridged hydrocarbon compound residue includes bicyclo[2.2.1]heptan-1-yl, tricyclo[3.3.1.13.7]decan-1-yl, and 7,7-dimethyl-bicyclo[2.2.1]heptan-1-yl.

The sulfonyl group includes an alkylsulfonyl group, an arylsulfonyl group, a halogen substituted alkyl sulfonyl group, and a halogen substituted arylsulfonyl group. The sulfinyl group includes an alkyl sulfinyl group, and an aryl sulfinyl group. The sulfonyloxy group includes an alkylsulfonyloxy group, and an arylsulfonyloxy group. The sulfamoyl group includes an N,N-dialkylsulfamoyl group, an N,N-diarylsulfamoyl group, and an N-alkyl-N-arylsulfamoyl group. The phosphoryl group includes an alkoxyphosphoryl group, an aryloxyphosphoryl group, an alkylphosphoryl group, and an arylphosphoryl group. The carbamoyl group includes an N,N-dialkylcarbamoyl group, N,N-diarylcarbamoyl group, and an N-alkyl-N-arylcarbamoyl group. The acyl group includes an alkylcarbonyl group, and an arylcarbonyl group. The acyloxy group includes an alkylcarbonyloxy group. The oxycarbonyl group includes an alkoxycarbonyl group, and an aryloxycarbonyl group. The halogen substituted alkoxy group includes an α-halogen substituted alkoxy group. The halogen substituted aryloxy group includes a tetrafluoroaryloxy group, and a pentafluoroaryloxy group. The pyrrolyl group includes 1-pyrrolyl group. The tetrazolyl group include 1-tetrazolyl group.

In addition to the above substitution groups, such as each of groups of trifluoromethyl, heptafluoro-i-propyl, nonylfluoro-t-butyl, and a tetrafluoroaryl group, and a pentafluoroaryl group may be preferably used. In addition, these substitution groups may be substituted by other substitution groups.

In view of formability, the content of noncyclic monomer in the copolymer in the present invention is preferably 20% by mass or more, more preferably 25% or more and 90% or less, and still more preferably 30% or more and 85% or less.

The glass transition temperature (Tg) of the polymer or copolymer in the present invention is preferably from 80 to 250° C., more preferably from 90 to 220° C., and most preferably 100 to 200° C. The number average molecular weight (Mn) is preferably in the range of 10,000 to 1,000,000, more preferably 20,000 to 500,000, and most preferably 50,000 to 300,000 in terms of a polystyrene conversion value measured by a gel permeation chromatography (GPC). The molecular weight distribution is preferably 2.0 or less, when it is represented by a ratio of Mn to Mw (Mw/Mn), in which Mw is the weight average molecular weight in terms of a polystyrene conversion value measured in the same manner by GPC.

When the Mw/Mn is excessively large, the mechanical strength and the thermal resistance of the compact are reduced. In order to increase, in particular, mechanical strength, thermal resistance and forming processing property, the Mw/Mn is preferably 1.8 or less, and particularly preferably 1.6 or less.

The temperature at the time of polymerization is preferably selected from the range of 0 to 200° C., and more preferably 50 to 150° C., and the pressure is selected from the range of atmospheric pressure to 100 atmospheres. The molecular weight of the polymer formed can be easily adjusted by including hydrogen in the polymer band.

The olefin resin in the present invention may be a polymer synthesized from a single component cyclic monomer, but is preferably a cyclic monomer having two components or more, or a copolymer synthesized from a cyclic monomer and a noncyclic monomer. The above copolymer may be produced using a monomer having 1,000 components or more, but the monomer is preferably a mixture of 10 components or less in view of production efficiency and polymer stability. Five components or less is still more preferable.

The copolymer obtained may be a crystalline polymer or a non-crystalline polymer, but a non-crystalline polymer is preferable.

Commonly known methods may be used for the method of hydrogen addition of the carbon-carbon unsaturated bond (including an aromatic ring) of the polymer and copolymer in the present invention, but of these, it is preferable to perform the hydrogen addition reaction using a catalyst including at least one metal selected from nickel, cobalt, iron, titanium, rhodium, palladium, platinum, ruthenium, and rhenium in an organic solvent in order to improve the hydrogen addition ratio and at the same time to reduce the polymer chain breaking reaction that occurs simultaneously with the hydrogen addition reaction. Either a heterogeneous catalyst or a homogeneous catalyst may be used as the hydrogenation catalyst. The heterogeneous catalysts may simply be a metal or metal compound or may be carried by a proper carrier. The carrier includes, for example, active carbon, silica, alumina, calcium carbide, titania, magnesia, zirconia, diatomaceous earth, and silicon carbide, and the amount of the catalyst carrier, which is the amount of metal to the total weight amount of catalyst, is normally in the range of 0.01 to 80% by mass, and more preferably 0.05 to 60% by mass. The homogeneous catalyst may be a catalyst, in which nickel, cobalt, titanium or an iron compound is combined with an organic metal compound (for example, an organic aluminum compound, and an organic lithium compound), or an organic metal complex catalyst comprising a metal such as rhodium, palladium, platinum, ruthenium, and rhenium. These hydrogen addition catalysts may be used singly or in combinations of two or more, and the amount to be used is usually 0.01 to 100 parts by mass, more preferably 0.05 to 50 parts by mass, and still more preferably 0.1 to 30 parts by mass with respect to 100 parts by mass of the polymer.

The temperature of the hydrogen addition reaction is usually 0 to 300° C., preferably in the range from room temperature to 250° C., and particularly preferably in the range from 50 to 200° C.

The hydrogen pressure is usually 0.1 MPa to 30 MPa, preferably 1 MPa to 20 MPa, and more preferably 2 MPa to 15 MPa. The hydrogen addition ratio of the obtained hydrogen additive is usually 90% or more, preferably 95% or more, and more preferably 97% or more of the carbon-carbon unsaturated bond of the main chain, when determined via 1H-NMR, in view of thermal resistance and weather resistance. When the hydrogen addition ratio is low, the optical properties such as transparency, low birefringence and thermal stability of the polymer to be obtained are reduced.

Any solvent may be used in the hydrogen addition reaction of the polymer and copolymer in the present invention as long as it dissolves the polymer and copolymer in the present invention and hydrogen is not added to the solvent itself, and the solvent includes, for example, ethers such as tetrahydrofuran, diethyl ether, dibutyl ether, and dimethoxy ethane; aromatic hydrocarbons such as benzene, toluene, xylene, and ethyl benzene; aliphatic hydrocarbons such as pentane, hexane, and heptane; aliphatic cyclic hydrocarbons such as cyclopentane, cyclohexane, methyl cyclohexane, dimethyl cyclohexane, and decalin; and halogenated hydrocarbons such as methylene dichloride, dichloroethane, dichloroethylene, tetrachloroethane, chlorobenzene, and trichlorobenzene, and these may be used in combinations of two or more.

The production of the polymer or copolymer hydrogen additive in the present invention can be conducted by separating the polymer or copolymer hydrogen additive from the polymer solution, after which the separated additive is re-dissolved in a solvent, but there may also be used a method in which, without carrying out the separation, the hydrogen addition reaction is performed by adding the hydrogen addition catalyst comprising the above organic metal complex and organic aluminum compound. After the completion of the hydrogen addition reaction, the hydrogen addition catalyst remaining in the polymer can be removed by commonly known methods. The removing methods include, for example, an absorption method using an absorption agent; an extraction method in which an organic acid such as lactic acid, a poor solvent and water are added to a solution of a good solvent, and the resulting system is subjected to extraction and removal at room temperature or at increased temperature; and a washing method in which washing is done after a solution of a good solvent or a polymer shiny is subjected to contact treatment with a basic compound such as trimethylene diamine, aniline, pyridine, ethane diamide, and sodium hydroxide in an atmosphere of nitrogen or hydrogen, or after the contact treatment is done with an acidic compound such as acetic acid, citric acid, benzoic acid, and hydrochloric acid at the same time of being subjected to the contact treatment.

A method for recovering the hydrogenated polymer from a solution of the polymer or copolymer hydrogen additive in the present invention is not particularly limited, and commonly known methods may be used. The method includes, for example, a method in which a reaction solution is charged into a poor solvent while stirring to coagulate the hydrogenated polymer, and then, the resulting product is recovered by a filtration method, a centrifuge separation method, and a decantation method; a steam stripping method in which steam is blown into a reaction solution to precipitate the hydrogenated polymer; and a direct removal method in which a solvent is directly removed from a reaction solution by heating and the like.

When the hydrogen addition reaction described above is used, a hydrogen addition rate of 90% or more is easily achieved, and it is possible to achieve a rate of 95% or more and in particular 99% or more, and the polymer or copolymer hydrogen additive thus obtained is not easily oxidized, resulting in an excellent polymer or copolymer hydrogen additive.

(Method of Controlling a Resin Composition)

A method of controlling a resin composition of the present embodiment will be described below.

A resin composition of the present embodiment is preferably added a specific treatment prior to the molding step (molding process), and at the treatment stage, plasticizers, antioxidants and other additives which are normally added to resins, may be added.

As a method of controlling a resin composition of the present embodiment, there are preferably cited processes including a kneading process or a solvent removal method in which the mixture is dissolved in a solvent and the composition is obtained after removing the solvent and drying processes, but the kneading process is more preferable. The kneading process may be those processes used in blending normal resins. Rolls, banbury mixers, biaxial kneaders, and kneader ruder may be used but the banbury mixer, biaxial mixers, and kneader ruder are preferable. In order to prevent oxidation of the resin, a device in which kneading is possible in a sealed system is used, and the kneading process is more preferably performed in an inactive gas such as nitrogen or argon.

When preparing the resin composition according to the present embodiment, or during the molding process for the resin composition, various additives (may be called as blending agents) may be added according to need. The additives used are not particularly limited, and examples include stabilizers such as antioxidants, thermal stabilizers, light stabilizers, weather stabilizers, ultraviolet light absorbers, and near infrared light absorbers; resin improving agents such as lubricants and plasticizers; colorants such as dyes and pigments; antistatic agents, flame retardants and fillers. These blending agents may be used singly or in combinations of two or more, and may be suitably selected within a range where the effects of the invention are not compromised.

<Antioxidant>

The antioxidant used for the present invention will be described in the following.

As the antioxidant, a phenol antioxidant, a phosphorus antioxidant and a sulfur antioxidant are usable and the phenol antioxidant, particularly an alkyl-substituted phenol antioxidant, is preferable. By the addition of such the antioxidants, coloring and strength lowering of the lens caused due to oxidation on the occasion of the lens formation can be prevented without lowering in the transparency and the resistivity against heat. These antioxidants may be employed singly or in combination of two or more of them. Though the adding amount of the antioxidant may be optionally decided within the range in which the effects of the present invention are not disturbed, the amount is preferably 0.001 to 5, and more preferably from 0.01 to 1, parts by weight to 100 parts by weight of the polymer relating to the present invention.

<Light Stabilizer>

The light stabilizer used in the present invention will be described in the following.

As a light stabilizer, a benzophenone light stabilizer, a benzotriazole light stabilizer and a hindered amine light stabilizer are cited. In the present invention, the hindered amine light stabilizers are preferably employed from the viewpoint of the transparency and the anti-coloring ability of the lens. Among the hindered amine light stabilizer, hereinafter referred to as HALS, ones having a Mn measured by GOC using tetrahydrofuran (THF) and converted into polystyrene of from 1,000 to 10,000, particularly from 2,000 to 5,000, and especially from 2,800 to 3,800, are preferable. When the Mn is too small, the designated amount of the HALS is difficulty added by the reason of evaporation thereof on the occasion of the addition of the HALS into the block-copolymer by heating, meting and kneading, or the processing suitability of the composite material is lowered so that a bubble and a silver streak are formed on the occasion of the forming by heating and melting. Furthermore, the volatile ingredient is formed in a gas state when the lens is used for long time while the light source lamp lights. When the Mn is too large, the dispersibility of the HALS in the block copolymer is lowered so that the transparency of the lens is decreased and the improving effect on the light stabilization is lowered. In the present invention, therefore, the lens superior in the processing stability, low gas formation and transparency can be obtained by making the Mn of the HALS into the above range.

As such the HALS, there is a preferably cited ones having a Mn of from 2,000 to 5,000 such as the polycondensation product of dibutylamine, 1,3,5-triazine and N,N'-bis(2,2,6,6-tetramethyl-4-piperidyl)butylamine, poly[(6-morpholino-s-triazine-2,4-di-yl)(2,2,6,6-tetramethyl-4-piperidyl)imino]-hexamethylene-(2,2,6,6-tetramethyl-4-piperidyl)iminol and the polymer of dimethyl succinate and 4-hydroxy(2,2,6,6-tetramethyl-1-piperidineethanol are preferable.

<UV Absorbent>

Among UV absorbents, preferable are 2-(2'-hydroxy-5'-methylphenyl)benzotriazole, 2-(2H-benzotriazole-2-il)-4-methyl-6-(3,4,5,6-tetrahydrophthalimidylmethyl)phenol and 2-(2H-benzotriazole-2-il)-4,6-bis(1-methyl-1-phenylethyl)phenol, with respect to such as heat resistance and low volatility.

The blending amount of the above light stabilizer and UV absorbent to the resin of the present invention is preferably 0.01-20 weight parts, more preferably 0.02-15 weight parts and most preferably 0.05-10 weight parts based on 100 weight parts of the polymer compound. The improvement effect of light fastness may not be obtained sufficiently resulting in coloring in such as the case of long period outdoor use, when the addition amount is excessively small. While, when the blending amount of HALS is excessively large, a part of the HALS may be converted to a gas to be generated, or dispersibility of the HALS may be decreased, resulting in decrease of transparency of a lens.

In the present invention, there is provided a resin composite comprising the resin composite in the present invention and at least one kind of a compounding agent selected from the group consisting of (1) a soft polymer, (2) an alcoholic compound, and (3) an organic or inorganic filler. By compounding these compounding agents, the generation of cloudiness under the environment of high temperature and high humidity can be prevented, without reducing various properties such as transparency, low water absorbency, and mechanical strength.

(1) Soft Polymer

The soft polymer used for the present invention is a polymer usually having Tg of 30° C. or less, and in case where the soft polymer has plural Tg's, it is preferable that at least the lowest Tg is 30° C. or less. The soft polymer may have a cross-linked structure, and may be a polymer in which a functional group is introduced by a reaction of regeneration.

Among the above soft polymers, the diene type soft polymer is preferred, and in particular, a hydrogenated product, in which in particular a carbon-carbon unsaturated bond of the aforesaid soft polymer is hydrogenated, is excellent in terms of rubber elasticity, mechanical strength, flexibility, and dispersibility.

(2) Alcoholic Compound

The alcoholic compound is a compound having at least non-phenolic hydroxyl group in the molecule, and preferably has at least one hydroxyl group and at least one ether bond or ester bond. The specific examples of these compounds include an alcoholic ether and ester compounds such as a poly-valent alcohol for example di or more-valent alcohol, preferably tri or more-valent alcohol, and more preferably poly-valent alcohol having 3 to 8 hydroxyl groups, in which one of the hydroxyl group is etherized or esterified.

The di- or more-valent alcohol includes, for example, polyethylene glycol, glycerol, trimethylolpropane, pentaerythritol, diglycerol, triglycerol, dipentaerythritol, 1,6,7-trihydroxy-2,2-di(hydroxymethyl)-4-oxo-heptane, sorbitol, 2-methyl-1,6,7-trihydroxy-2-hydroxymethyl-4-oxo-heptane, 1,5,6-trihydroxy-3-oxo-hexanepentaerythritol and tris (2-hydroxyethyl)isocyanurate. Of these, the tri- or more-valent alcohol, particularly having 3 to 8 hydroxyl groups, are preferable. To obtain the alcoholic ester compound, preferable are glycerol, diglycerol and triglycerol by which alcoholic ester compound containing $\alpha,\beta$-diol can be synthesized.

The poly-valent alcoholic compounds are used singly or in combination of two or more kinds thereof. The molecular weight of the poly-valent alcoholic compounds is not limited, but the compounds having the molecular weight of usually from 500 to 2,000, preferably from 800 to 1,500, also exhibit less reduction in transparency.

(3) Organic or Inorganic Filler

As the organic filler, usual organic polymer particles or crosslinked organic polymer particles can be used. The organic filler includes, for example, particles or crosslinked particles of a polyolefin such as polyethylene and polypropylene; a halogen-containing vinyl polymer such as poly(vinyl chloride) and poly(vinylidene chloride); a polymer derived from an $\alpha,\beta$-unsaturated acid such as polyallylate and polymethacrylate; a polymer derived from an unsaturated alcohol such as poly(vinyl alcohol) and poly(vinyl acetate); a polymer derived from polyethylene oxide or bisglycidyl ether; an aromatic condensate polymer such as polyphenylene oxide, polycarbonate and polysulfone; polyurethane; polyamide; polyester; aldehyde; aldehyde phenol type resin; and a natural polymer compound.

The inorganic filler includes, for example, particles of a compound of an element of Group 1 of the periodic table such as lithium fluoride and borax (sodium borate hydrate); a compound of an element of Group 2 such as magnesium carbonate, magnesium phosphate, calcium carbonate, strontium titanate and barium carbonate; a compound of an element of Group 4 such as titanium dioxide (titania) and titanium monoxide; a compound of an element of Group 6 such as molybdenum dioxide and molybdenum trioxide; a compound of an element of Group 7 such as manganese chloride and manganese acetate; a compound of an element of Groups 8 to 10 such as cobalt chloride and cobalt acetate; a compound of an element of Group 11 such as cuprous iodide; a compound of an element of Group 12 such as zinc oxide and zinc acetate; a compound of an element of Group 13 such as aluminum oxide (alumina), aluminum fluoride and aluminosilicate (alumina silicate, kaolin and kaolinite); a compound of an element of Group 14 such as silicon oxide (silica and silica gel), graphite, carbon, graphite, and glass; and a natural mineral such as camallite, kainite, mica (mica and phlogopite) and bairose mineral.

The compounding amount of the compounds designated by (1) to (3) is decided by the combination of the copolymer and the compound to be compounded. Generally, when the compounding amount is excessively large, the glass transition temperature and the transparency of the composition are largely lowered, resulting in unsuitable for the use as an optical material. When the compounding amount is excessively small, cloudiness of the molded product may be generated under high temperature and high humidity. The compounding amount is usually 0.01 to 10 parts by mass, preferably 0.02 to 5 parts by mass, and particularly preferably 0.05 to 2 parts by mass with respect to 100 parts by mass of the copolymer. When the compounding amount is excessively small, the effect for preventing generation of the cloudiness under high temperature and high humidity cannot be obtained, and when the compounding amount is excessively large, thermal resistivity and transparency of the molded product are lowered.

The composition of the resin having the above-described alicyclic structure can be obtained by blending properly each of the above constituents. The blending method is not particularly limited as long as each of the constituents is sufficiently dispersed in hydrocarbon polymer, and includes, for example, a method for kneading resin in a melt state using a mixer, a biaxial kneading machine, a roll, the Brabender, a extruder, and the like, and a method in which the above constituent is dissolved in a proper solvent and dispersed, after which the dispersion is coagulated. In case of using the biaxial kneading machine, after kneading, the resulting product is generally extruded in a melt state into sticks, which are then cut into a proper length by a strand cutter to be mostly used as a molding material in a pellet form.

When the above scanning optical system 101 satisfies the expression: $0.05 \leq NA1 \cdot t1 \leq 1.5$, preferably the expression: $0.1 \leq NA1 \cdot t1 \leq 1$, and in addition the above-described plastic material is used for the first lens 6, the generation of cloudiness of the first lens 6 can be prevented.

In addition to that, when the scanning and image-forming optical system 8 satisfies the expressions: $0.05 \leq t2/f1 \leq 0.4$, and $f1 \geq 0$, and uses the above-described plastic material for the second lens 7, and preferably satisfies the following formula: $0.1 \leq t2/f1 \leq 0.25$, the generation of cloudiness of the second lens 7 can be prevented.

Further, when the scanning and image-forming optical system 8 satisfies the following formula: $0.25 \leq \Sigma d/f \leq 0.5$, the whole of the scanning and image-forming optical system 8 can be made smaller, and the production cost can also be reduced. In addition, since the ratio of uneven thickness between the central part and the peripheral part of the first lens 6 and the second lens 7 can be reduced, unlike in the case of a large ratio of uneven thickness, it is possible to prevent a lack of image uniformity caused by a difference in light amount at each image forming position.

The present invention should not be construed to be limited to the above embodiment, but can naturally be properly modified or improved.

For example, in the above embodiment, as the light source device 1, a device emitting one light flux was used, but a device emitting plural light fluxes may be used. In this case, a number of lines, equivalent to the number of light fluxes, can be written simultaneously in a single scan, thereby high-speed image formation can be achieved. Further, as described above, since lenses in which a light stabilizer is incorporated are used for the first lens 6 and the second lens 7, even if plural light fluxes are simultaneously irradiated to a part, cloudiness of a lens can be prevented.

Further, though it was described in the above section that a diffractive structure could be provided on at least one of optical surfaces of the first lens 6 and the second lens 7, it can be provided on an optical surface of the collimator lens 2 or a cylindrical lens 3 in the line-image-forming optical system 4, and furthermore, it can be provided on an optical surface of other optical elements arranged on an optical path in addition to the above lenses. However, it is preferable that such a diffractive structure is provided on the optical surface of a lens at the deflection optical system 5 side rather than the scanning surface H side.

Further, it was described in the above section that the deflection optical system 5 deflected an optical flux using the polygon mirror 50, but, as shown in FIGS. 6 and 7 to be described later, a resonance mirror (mirror) 50A, which generates a sinusoidal oscillation of a reflection surface, can be used. On this point, in case of using such the resonance mirror 50A in the deflection optical system 50, since an arcsine θ lens is generally used as the scanning and image-forming optical system 8, and as a result that an NA of a light flux passing through the central part of the above lens differs from an NA of a light flux passing through the periphery of the above lens, there exists a problem that a beam becomes thick in the main-scanning direction y at positions where an image height is high. To correct the such thickness of the beam size, it is required that slightly diverged light in the main-scanning direction y is entered into the deflected optical system 5 so that the size of the light flux passing through the central part of the lens and the size of the light flux passing through the peripheral part of the lens of the scanning and image-forming optical system 8 differ with each other, and at the same time, the distance between the deflected optical system 5 and the scanning and image-forming optical system 8 is properly adjusted. However, using the conventional light flux having a long wavelength, when the diverged light is made to enter the deflected optical system 5, the beam size in the main-scanning direction y at the time of light incidence becomes excessively large, and then, the mirror itself of the deflected optical system 5 also becomes large, thereby such a system is inadequate for practical use in regulation and cost. In this regard, in case of using the above-described resonance mirror 50A for the deflection optical system 5 in the present embodiment, since the wavelength of the light flux is in the blue region, the thickening of the beam size can be prevented without widening the beam width so much. As a result, the thickening of the beam size can be prevented while using the working resonance minor 50A.

EXAMPLES

Example (1)

Next, examples suitable for the present embodiment will be described. The alphanumeric symbols used for the above description are as follows:

λ: wavelength
n1: diffractive index of the first lens
n2: diffractive index of the second lens
t1: distance [mm] from the polygon mirror to the first lens
d1: center thickness [mm] of the first lens (refer to FIG. 1)
t2: distance [mm] between the first lens and the second lens
d2: center thickness [mm] of the second lens (refer to FIG. 1)
d3: distance [mm] from a last surface of the second lens to the image plane T2: tilt quantity [degree] around the z-axis of the second lens (refer to FIG. 3b)

S2: shift quantity [mm] in the y-axis direction of the second lens (refer to FIG. 3b)

f: focal length [mm] of the scanning and image-forming optical system in the main-scanning direction f1: focal length [mm] of the first lens in a main-scanning direction NA1: sine value of incidence angle to a polygon in the sub-scanning direction Σd: distance [mm] from the deflection optical system to the last surface of the lenses (refer to FIG. 2)

R: curvature radius $R_0$: curvature radius of the anamorphic lens surface around the optical axis in a perpendicular surface to the main-scanning direction (being a cross-section in a sub-scanning direction)

In the tables below, an exponent for 10 is assumed to be expressed by using E (for example, $2.5 \times 10^{-02}$ is expressed by 2.5E-02).

Example 1

As a scanning optical system of the Example 1, a system shown in Table 1 below was produced.

TABLE 1

| Symbol | Data |
|---|---|
| λ | 405 nm |
| n1 | 1.550131 |
| n2 | 1.550131 |
| t1 | 40 mm |
| d1 | 10 mm |
| t2 | 89 mm |
| d2 | 6 mm |
| d3 | 248 mm |
| T2 | 0.34° |
| S2 | 0.06 mm |
| f | 320 mm |
| NA1 | 0.01726 |
| NA1 × t1 | 0.69037 |
| t2/f1 | 0.31101 |
| Σd/f | 0.45313 |

As a resin being a base material for the first lens and the second lens, used is a TOPAS5013LS-01 (manufactured by Polyplastic Co., Ltd.) exhibiting excellent light resistance. The specific shapes of the first lens 6 and the second lens 7 are made to be an aspheric shape represented by the expression (iii) and Table 2 given below. The unit of values in the table is mm.

$$x = \frac{h^2/R}{1 + \sqrt{1 - (K+1)h^2/R^2}} + A_4 h^4 + A_6 h^6 + A_8 h^8 + A_{10} h^{10} + A_{12} h^{12} \quad \text{(iii)}$$

In the expression, h represents a distance [mm] in the Y axis direction in the above FIG. 3b, K represents a conic constant, $A_4, A_6, A_8, A_{10}$, and $A_{12}$ represent a coefficient of the aspheric shape.

TABLE 2

|  |  | First lens | | Second lens | |
| --- | --- | --- | --- | --- | --- |
|  |  | First surface* | Second surface** | Third surface*** | Fourth surface** |
| Main-scanning direction | R | −53.44955 | −42.26170 | −241.65828 | −330.08982 |
|  | K | 0 | −2.36083E−01 | 0 | 2.4952323E+01 |
|  | $A_4$ | 0 | 1.45191E−07 | 3.8707E−08 | −1.37010E−08 |
|  | $A_6$ | 0 | 1.26639E−10 | −5.1302E−12 | 9.46146E−12 |
|  | $A_8$ | 0 | −2.53621E−13 | 3.1636E−15 | 6.06087E−15 |
|  | $A_{10}$ | 0 | 2.91054E−16 | 6.1516E−19 | −4.55909E−19 |
|  | $A_{12}$ | 0 | 0 | −4.5659E−22 | 0 |
| Sub-scanning direction | $R_0$ |  |  | 60.60070 |  |

*Rotationally-symmetrical spherical surface
**Rotationally-symmetrical aspheric surface
***Anamorphic surface Example (2)

As a scanning optical system of the Example 2, a system shown in Table 3 below was produced.

TABLE 3

| Symbol | Data |
| --- | --- |
| λ | 405 nm |
| n1 | 1.550131 |
| n2 | 1.550131 |
| t1 | 40 mm |
| d1 | 10 mm |
| t2 | 74 mm |
| d2 | 6 mm |
| d3 | 206 mm |
| T2 | 0.55° |
| S2 | 0.23 mm |
| f | 280 mm |
| NA1 | 0.01539 |
| NA1 × t1 | 0.61569 |
| t2/f1 | 0.31886 |
| Σd/f | 0.46429 |

As a resin being a base material for the first lens 6 and the second lens 7, used is a TOPAS5013LS-01 (manufactured by Polyplastic Co., Ltd.) exhibiting excellent light resistance. The specific shapes of the first lens 6 and the second lens 7 are made to be an aspheric shape represented by the above expression (iii) and Table 4 given below. The unit of values in the table is mm.

TABLE 4

|  |  | First lens | | Second lens | |
| --- | --- | --- | --- | --- | --- |
|  |  | First surface* | Second surface** | Third surface*** | Fourth surface** |
| Main-scanning direction | R | −65.67873 | −45.00826 | −115.82101 | −158.72144 |
|  | K | 0 | −4.17275E−01 | 0 | 1.340005 |
|  | $A_4$ | 0 | −8.33079E−08 | −1.67402E−07 | −2.96845E−07 |
|  | $A_6$ | 0 | 4.33600E−11 | −1.90022E−11 | −3.81517E−12 |
|  | $A_8$ | 0 | −1.32606E−13 | −1.31120E−15 | −3.01010E−15 |
|  | $A_{10}$ | 0 | 6.80507E−17 | −4.51271E−18 | −1.63169E−18 |
|  | $A_{12}$ | 0 | 0 | 2.86504E−22 | 0 |
| Sub-scanning direction | $R_0$ |  |  | 63.51210 |  |

*Rotationally-symmetrical spherical surface
**Rotationally-symmetrical aspheric surface
***Anamorphic surface Example 3

As a scanning optical system of the Example 3, a system shown in Table 5 below was produced.

TABLE 5

| Symbol | Data |
| --- | --- |
| λ | 405 nm |
| n1 | 1.550131 |
| n2 | 1.550131 |
| t1 | 40 mm |
| d1 | 10 mm |
| t2 | 49 mm |
| d2 | 6 mm |
| d3 | 245 mm |
| F | 280 mm |
| NA1 | 0.01539 |
| NA1 × t1 | 0.61569 |
| t2/f1 | 0.19363 |
| Σd/f | 0.375 |

As a resin being a base material for the first lens 6 and the second lens 7, used is a TOPAS5013LS-01 (manufactured by Polyplastic Co., Ltd.) exhibiting excellent light resistance. The specific shape of the first lens 6 is made to be a shape represented by the above expression (iii) and Table 6 given below. Namely, the shape of the first lens 6 is, in the main-scanning direction, made to be an aspheric shape represented by a function up to tenth degree, and is, in the sub-scanning direction, made to be a spherical shape which successively varies in an image height direction. The unit of values in the table is mm.

The specific shape of the second lens 7 is made to be a shape represented by the above expression (iii) and Table 6 given below. Namely, the shape of the second lens 7 is, in the main-scanning direction, made to be an aspheric shape represented by a function up to twelfth degree, and is, in the sub-scanning direction, made to be a shape which successively varies in an image height direction.

In this second lens 7, provided that $R_0$ represents a curvature radius of a cross-section in a sub-scanning direction on an optical axis, $CCj$ (J=1, 2, . . . , 10) represents a coefficient of determination of curvature radius of a cross-section in a sub-scanning direction, and Y represents a distance from an optical axis in a main-scanning direction, a curvature radius r' of a cross-section in a sub-scanning direction is represented by the expression (iv) below.

$$r' = R_0(1 + CC1Y + CC2Y^2 + CC3Y^3 + \ldots CC10Y^{10}) \quad (iv)$$

In the expression (iv), a value of r' represents a surface shape in a bilateral asymmetry, by providing coefficients $CCj$ whose values are different between at the side of light source device 1 and at the opposite side (refer to FIG. 1) with respect to the reference axis X (being the optical axis) in the plane parallel to the main-scanning direction y. Specifically, at the light source side, r' is represented by the following expression:

$$r' = R_0(1 + C_2Y^2 + C_4Y^4 + C_6Y^6 + C_8Y^8 + C_{10}Y^{10}), \text{ and}$$

at the opposite side of light source, r'' is represented by the following expression (refer to FIG. 5):

$$r'' = R_0(1 + D_2Y^2 + D_4Y^4 + D_6Y^6 + D_8Y^8 + D_{10}Y^{10}),$$

With these r' and the r'', the second lens 7 has a surface shape in asymmetry with respect to the reference axis X.

A relation between the curvature radius at a cross-section perpendicular to the sub-scanning direction z and the distance from the optical axis, when the above second lens 7 is used for the scanning optical system given in the above Table 5, is as given in FIG. 5.

Example 4

As a scanning optical system of the Example 4, a system shown in FIGS. 4 and 5, and Table 7 below was produced. In Table 7, the symbols "T2'" and "S2'" mean the tilt quantity around the Y-axis of the second lens (refer to FIG. 5), and the shift quantity in the z-axis direction of the second lens (refer to FIG. 5), respectively.

TABLE 7

| Symbol | Data |
| --- | --- |
| λ | 405 nm |
| n1 | 1.550131 |
| n2 | 1.550131 |
| t1 | 52.6 mm |
| d1 | 16.5 mm |
| t2 | 18.7 mm |
| d2 | 11 mm |
| d3 | 225 mm |
| T2' | 0.73° |
| S2' | −9.8 mm |
| f | 202.505 mm |
| NA1 | 0.02111 |
| NA1 × t1 | 1.11126 |
| t2/f1 | 0.15130 |
| Σd/f | 0.48807 |

As shown in FIGS. 6 and 7, in the scanning optical system of the present example, the deflection optical system 5 has a pair of resonance mirrors 50A, which generates a sinusoidal oscillation of a reflection surface. Aberrations are corrected with the scanning and image-forming optical system 8 so as to scan the scanning surface H at a uniform velocity with the laser light deflected by the above resonance mirror 50A. Further, in this scanning optical system, a light flux enters the deflection optical system 5 from an oblique direction in a perpendicular plane to the sub-scanning direction z, and enters the deflection optical system 5 in almost the front in a perpendicular plane to the main-scanning direction y. Further, in this scanning optical system, the second lens 7 de-centered with respect to the reference axis X is provided. In FIG. 7, to

TABLE 6

| | | First lens | | Second lens | |
| --- | --- | --- | --- | --- | --- |
| | | First surface* | Second surface** | Third surface*** | Fourth surface** |
| Main-scanning direction | R | −40.85898 | 33.86624 | 195.54966 | 259.13358 |
| | K | 0 | −4.65355E−01 | 4.46282 | 1.86605 |
| | $A_4$ | 0 | 2.92802E−08 | −2.72583E−07 | 2.65783E−07 |
| | $A_6$ | 0 | 2.21891E−10 | 1.07767E−10 | 2.96976E−11 |
| | $A_8$ | 0 | 3.42866E−14 | −2.93254E−14 | −6.82854E−15 |
| | $A_{10}$ | 0 | 9.19917E−17 | 7.82047E−18 | 2.81305E−18 |
| | $A_{12}$ | 0 | 0 | −6.31159E−22 | 0 |
| Sub-scanning direction | $R_0$ | 0 | 0 | −52.70736 | 0 |
| | $C_4$ | 0 | 0 | 3.50866E−05 | 0 |
| | $C_6$ | 0 | 0 | 4.70075E−08 | 0 |
| | $C_8$ | 0 | 0 | −3.24390E−11 | 0 |
| | $C_{10}$ | 0 | 0 | 1.62570E−14 | 0 |
| | $C_{12}$ | 0 | 0 | −3.04700E−18 | 0 |
| | $D_4$ | 0 | 0 | 4.80051E−05 | 0 |
| | $D_6$ | 0 | 0 | 2.17164E−08 | 0 |
| | $D_8$ | 0 | 0 | −2.22817E−13 | 0 |
| | $D_{10}$ | 0 | 0 | −1.91539E−15 | 0 |
| | $D_{12}$ | 0 | 0 | 7.12279E−19 | 0 |

*Rotationally-symmetrical spherical surface
**Rotationally-symmetrical aspheric surface
*Anamorphic surface simplify an illustration, the illustration of the line-image-forming optical system 4** is omitted.

As a resin being a base material for the first lens 6 and the second lens 7, used is a TOPAS5013LS-01 (manufactured by Polyplastic Co., Ltd.) exhibiting excellent light resistance. The specific shapes of the first lens 6 and the second lens 7 are made to be a free-form surface lens (being a polynomial surface in Y-Z direction) represented by the expression (v) and Table 8 given below, in order to successfully correct for a scanning line curvature and a curvature of field while keeping a uniform beam size and a uniform scanning characteristic on the scanning surface H.

$$x = \frac{h^2/R}{1 + \sqrt{1-(1+K)(h/R)^2}} + \sum_{j=2}^{\infty} C_j y^m z^n \quad (v)$$

$$j = 1 + [(m+n)^2 + m + 3n]/2$$

In the expression, $C_j$ is a coefficient of $y^m z^n$, and represents values given in Table 9 below. The values of m and n represent any natural number (where $m+n \leq 10$).

TABLE 8

|  |  | First lens | | Second lens | |
| --- | --- | --- | --- | --- | --- |
|  |  | First surface* | Second surface* | Third surface** | Fourth surface** |
| Main-scanning direction | R | −340.27215 | 78.21865 | 185.37241 | −492.21258 |
|  | K | −71.967824 | −1.07758 | −1.18006 | −8.52652E−02 |
|  | $A_4$ | −7.50562E−08 | −8.29524E−08 | 0 | 0 |
|  | $A_6$ | −5.01046E−11 | −5.13259E−11 | 0 | 0 |
|  | $A_8$ | 1.28276E−14 | −1.21082E−14 | 0 | 0 |
|  | $A_{10}$ | 3.08994E−18 | 2.43224E−18 | 0 | 0 |
|  | $A_{12}$ | −3.61937E−22 | 2.61221E−21 | 0 | 0 |
| Coefficient of polynomial surface | $C_4$ | 0 | 0 | −2.22358E−03 | −3.03880E−03 |
|  | $C_6$ | 0 | 0 | −1.21111E−02 | 2.09609E−03 |
|  | $C_{11}$ | 0 | 0 | −3.73717E−07 | −1.52816E−07 |
|  | $C_{13}$ | 0 | 0 | −9.43270E−07 | −1.74303E−06 |
|  | $C_{15}$ | 0 | 0 | −5.49248E−06 | −5.63180E−06 |
|  | $C_{22}$ | 0 | 0 | 7.30801E−12 | 4.21170E−12 |
|  | $C_{24}$ | 0 | 0 | 6.13538E−11 | 9.12110E−11 |
|  | $C_{26}$ | 0 | 0 | −3.98706E−10 | −4.79570E−10 |
|  | $C_{28}$ | 0 | 0 | 3.72577E−09 | 2.95930E−09 |
|  | $C_{37}$ | 0 | 0 | 5.08894E−15 | 2.25939E−15 |
|  | $C_{39}$ | 0 | 0 | 5.92118E−15 | 3.31361E−15 |
|  | $C_{41}$ | 0 | 0 | 1.34468E−13 | 1.61262E−13 |
|  | $C_{43}$ | 0 | 0 | 8.71850E−13 | 4.68179E−13 |
|  | $C_{45}$ | 0 | 0 | −9.31934E−12 | −1.26610E−11 |

*Rotationally-symmetrical spherical surface
**Free-form surface (Polynomial surface in Y-Z direction)

TABLE 9

| Coefficient | Term |
| --- | --- |
| $C_4$ | $y^2$ |
| $C_6$ | $z^2$ |
| $C_{11}$ | $y^4$ |
| $C_{13}$ | $y^2 z^2$ |
| $C_{15}$ | $z^4$ |
| $C_{22}$ | $y^6$ |
| $C_{24}$ | $y^4 z^2$ |
| $C_{26}$ | $y^2 z^4$ |
| $C_{28}$ | $z^6$ |
| $C_{37}$ | $y^8$ |
| $C_{39}$ | $y^6 z^2$ |
| $C_{41}$ | $y^4 z^4$ |
| $C_{43}$ | $y^2 z^6$ |
| $C_{45}$ | $z^8$ |

Example 5

As a scanning optical system of Example 5, a system shown in Table 10 below was produced.

TABLE 10

| Symbol | Data |
| --- | --- |
| λ | 405 nm |
| n1 | 1.550131 |
| n2 | 1.550131 |
| t1 | 15 mm |
| d1 | 10 mm |
| t2 | 59.2 mm |
| d2 | 6 mm |
| d3 | 303.56 mm |
| T2 | 0.0313° |
| S2 | 0.019 mm |
| f | 346 mm |
| NA1 | 0.01148 |
| NA1 × t1 | 0.1722 |
| t2/f1 | 0.19261 |
| Σd/f | 0.24383 |

AS shown Table 10, in the present embodiment, a value of NA1×t1 satisfies the following expression:

$$0.05 \leq NA1 \cdot t1 \leq 1.5.$$

As a resin being a base material for the first lens 6 and the second lens 7, used is a TOPAS5013LS-01 (manufactured by Polyplastic Co., Ltd.) exhibiting excellent light resistance. The specific shapes of the first lens 6 and the second lens 7 are made to be an aspheric shape represented by the above expression (ii) and Table 11 given below. The unit of values in the table is mm.

TABLE 11

| | | First lens | | Second lens | |
|---|---|---|---|---|---|
| | | First surface* | Second surface** | Third surface*** | Fourth surface** |
| Main-scanning direction | R | 27.83473 | 26.95211 | 74.80863592 | 77.38328 |
| | K | 0 | −0.67277 | 0 | 1.139443678 |
| | $A_4$ | 0 | 2.71043E−06 | 1.43159E−07 | 9.98550E−08 |
| | $A_6$ | 0 | 5.22472E−10 | 7.97462E−10 | 4.86143E−10 |
| | $A_8$ | 0 | 1.81602E−12 | −1.29527E−12 | −7.10424E−13 |
| | $A_{10}$ | 0 | 9.76825E−15 | 8.91235E−16 | 3.67153E−16 |
| | $A_{12}$ | 0 | 0 | −9.87511E−20 | 0 |
| Sub-scanning direction | $R_0$ | | | −73.12807 | |

*Rotationally-symmetrical spherical surface
**Rotationally-symmetrical aspheric surface
***Anamorphic surface Comparative Example 1

As a scanning optical system of Comparative Example 1, a system shown in Table 12 below was produced.

TABLE 12

| Symbol | Data |
|---|---|
| λ | 405 nm |
| n1 | 1.550131 |
| n2 | 1.550131 |
| t1 | 10 mm |
| d1 | 10 mm |
| t2 | 60.2 mm |
| d2 | 6 mm |
| d3 | 310.7 mm |
| T2 | 0.04° |
| S2 | 0.31 mm |
| f | 320 mm |
| NA1 | 0.0020 |
| NA1 × t1 | 0.0200 |
| t2/f1 | 0.18454 |
| Σd/f | 0.26934 |

As shown Table 12, in Comparative Example 1, a value of NA1×t1 is chosen so as not to satisfy the following expression:

$$0.05 \leq NA1 \cdot t1 \leq 1.5.$$

As a resin as abase material for the first lens 6 and the second lens 7, used is a TOPAS5013LS-01 (manufactured by Polyplastic Co., Ltd.) exhibiting excellent light resistance.

The specific shapes of the first lens 6 and the second lens 7 are made to be an aspheric shape represented by the above expression (ii) and Table 13 given below. The unit of values in the table is mm.

TABLE 13

| | | First lens | | Second lens | |
|---|---|---|---|---|---|
| | | First surface* | Second surface** | Third surface*** | Fourth surface** |
| Main-scanning direction | R | −27.6360 | −26.95965 | −81.38337 | −82.51108 |
| | K | 0 | −6.58723E−01 | 0 | 1.29329 |
| | $A_4$ | 0 | 2.81167E−06 | −2.35430E−07 | 1.73676E−07 |
| | $A_6$ | 0 | 1.51360E−09 | −7.15147E−10 | 4.43803E−10 |
| | $A_8$ | 0 | −2.53880E−11 | 1.27153E−12 | −7.08573E−13 |
| | $A_{10}$ | 0 | 1.61802E−13 | −9.98608E−16 | 4.34163E−16 |
| | $A_{12}$ | 0 | 0 | 1.10915E−19 | 0 |
| Sub-scanning direction | $R_0$ | | | 62.12480 | |

*Rotationally-symmetrical spherical surface
**Rotationally-symmetrical aspheric surface
***Anamorphic surface Evaluation of Examples 1 to 5 and Comparative Example 1

On the above Examples 1 to 5 and Comparative Example 1, an experiment on cloudiness was carried out.

Specifically, the laser was irradiated on lens samples of Examples 1 to 5 and Comparative Example 1 for 5,000 hours at a laser output power of 30 mW under a temperature of 80° C., using a blue semiconductor CW laser having a wavelength of 405 nm.

After that, appearances of lens of Examples 1 to 5 and Comparative Example 1 were visually observed, and the transmittances of the lens before and after the irradiation were determined. The results are given in Table 14 below.

TABLE 14

| | Cloudiness by visual observation | Transmittance % (relative value to that of before irradiation) |
|---|---|---|
| NA1 × t1 = 0.69 (Example 1) | None | 95 |
| NA1 × t1 = 0.62 (Example 2) | None | 95 |
| NA1 × t1 = 0.62 (Example 3) | None | 95 |
| NA1 × t1 = 1.11 (Example 4) | None | 97 |

TABLE 14-continued

| | Cloudiness by visual observation | Transmittance % (relative value to that of before irradiation) |
|---|---|---|
| NA1 × t1 = 0.17 (Example 5) | None | 90 |
| NA1 × t1 = 0.02 (Comparative Example 1) | Noticed | 70 |

As shown in Table 14, the lenses of Examples 1 to 5 showed no cloudiness and they were transparent, and were almost comparable in the transmittances to that of before irradiation treatment On the other hand, the lens of Comparative Example 1 already showed cloudiness, and the transmittance was reduced by about 30% compared to that of before irradiation treatment.

The invention claimed is:

1. A scanning optical system comprising:
a light source for emitting a light flux with a wavelength of 500 nm or less,
a deflecting optical system for deflecting the light flux emitted from the light source to carry out a scan in a main-scanning direction; and
a scanning and image-forming optical system for forming a light flux deflected by the deflecting optical system into an image on a scanning surface,
wherein the scanning and image-forming optical system comprises a first plastic lens arranged to be adjacent to the deflection optical system,
the scanning optical system satisfies $0.05 \leq NA1 \cdot t1 \leq 1.5$,
where NA1 is a numerical aperture in a sub-scanning direction for a light flux entering the deflection optical system, and t1 [mm] is a distance between the deflecting optical system and the first plastic lens, and
wherein the first plastic lens is a plastic lens comprising a resin comprising a copolymer of α-olefin and cyclic olefin, as a base material, and
the cyclic olefin is represented by the following general formula (I) or (II):

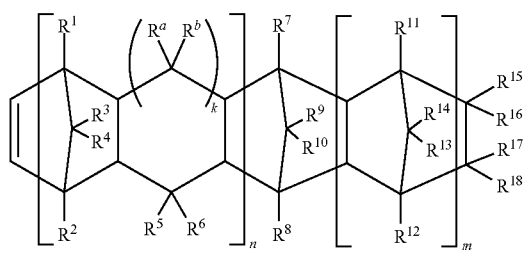

(I)

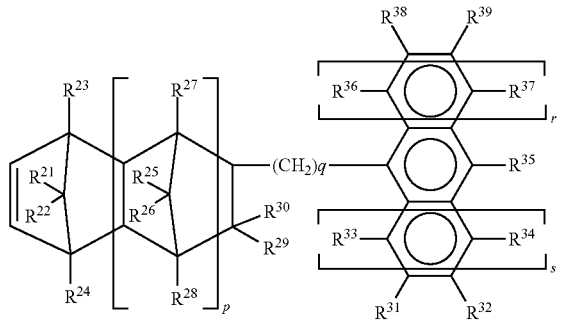

(II)

where, in the general formula (I), n is 0 or 1, m is 0 or a positive integer, k is 0 or 1, and each of $R^1$ to $R^{18}$, $R^a$, and $R^b$ independently represents hydrogen atom, halogen atom, or hydrocarbon group and where, in the general formula (II), each of p and q is 0 or a positive integer independently, each of r and s is one of 0, 1, and 2 independently, each of $R^{21}$ to $R^{39}$ represents independently hydrogen atom, halogen atom, hydrocarbon group, or alkoxy group.

2. The scanning optical system of claim 1,
wherein the scanning and image-forming optical system further comprises a second plastic lens arranged at a scanning-plane side of the first plastic lens,
the second plastic lens is a plastic lens including the resin as a base material, and
the scanning optical system satisfies $0.05 \leq t2/f1 \leq 0.4$ and $f1 \geq 0$, where f1 [mm] is a focal length of the first plastic lens in the main-scanning direction, and t2 is a distance between the first plastic lens and the second plastic lens.

3. The scanning optical system of claim 2,
wherein at least one of the first plastic lens and the second plastic lens has a cross section being in asymmetry, the cross section being parallel to the main-scanning direction.

4. The scanning optical system of claim 1,
wherein the resin comprises light stabilizer.

5. The scanning optical system of claim 1,
wherein the scanning optical system satisfies $0.1 \leq NA1 \cdot t1 \leq 1$.

6. The scanning optical system of claim 2,
wherein the scanning optical system satisfies $0.1 \leq t2/f1 \leq 0.25$.

7. The scanning optical system of claim 1,
wherein the scanning optical system satisfies $0.25 \leq \Sigma d/f \leq 0.5$, where f [mm] is a focal length of a total system of the scanning and image-forming optical system in the main-scanning direction, and $\Sigma d$ [mm] is a distance from the deflecting optical system to an optical surface arranged at a closest position to the scanning surface in the scanning and image-forming optical system.

8. The scanning optical system of claim 1,
wherein the light source emits two or more light fluxes.

9. The scanning optical system of claim 1,
wherein the first plastic lens has a cross section being in asymmetric, the cross section being parallel to the main-scanning direction.

10. The scanning optical system of claim 1, further comprising an optical element comprising at least one optical surface on which a diffractive structure is formed.

11. The scanning optical system of claim 1,
wherein the deflecting optical system comprises a resonance mirror for deflecting the light flux emitted from the light source by sinusoidal oscillation of a reflection surface of the resonance mirror.

12. An optical scanning device comprising the scanning optical system of claim 1.

13. An image forming device comprising the optical scanning apparatus of claim 12.

* * * * *